United States Patent [19]
Schulz et al.

[11] Patent Number: 5,642,283
[45] Date of Patent: Jun. 24, 1997

[54] MULTIPLE RATIO TRANSMISSION WITH SWAP-SHIFT CONTROLS

[75] Inventors: Winfried Franz-Xaver Schulz, Pulheim; Johann Kirchhoffer, Cologne; Stefan Huepkes, Viersen, all of Germany

[73] Assignee: Ford Motor Company, Dearborn, Mich.

[21] Appl. No.: 549,438

[22] Filed: Oct. 27, 1995

[51] Int. Cl.$^6$ .................................................. B60K 41/06
[52] U.S. Cl. ..................... 364/424.08; 364/424.09; 364/424.093; 475/59; 477/68; 192/3.33
[58] Field of Search ............... 364/424.08, 424.084, 364/424.087, 424.09, 424.093, 424.096; 475/59, 66, 70, 281; 192/3.3, 3.29, 3.33, 87.11; 477/68, 127, 144

[56] References Cited

U.S. PATENT DOCUMENTS

| | | | |
|---|---|---|---|
| 4,007,648 | 2/1977 | Bookout | 74/763 |
| 4,653,350 | 3/1987 | Downs et al. | 74/864 |
| 4,685,356 | 8/1987 | Iwatsuki | 74/866 |
| 4,730,519 | 3/1988 | Nakamura et al. | 74/866 |
| 4,817,473 | 4/1989 | Baltusis et al. | 477/65 |
| 4,856,383 | 8/1989 | Rosen | 477/131 |
| 4,868,753 | 9/1989 | Mori | 364/424.1 |
| 4,884,471 | 12/1989 | Daggett et al. | 74/758 |
| 4,939,955 | 7/1990 | Sugano | 475/278 |
| 4,966,050 | 10/1990 | Schulz et al. | 477/117 |
| 5,070,747 | 12/1991 | Lentz et al. | 74/866 |
| 5,078,663 | 1/1992 | Meffert | 475/284 |
| 5,131,902 | 7/1992 | Pierce | 475/281 |
| 5,150,296 | 9/1992 | Iwatsuki et al. | 364/424.1 |
| 5,167,592 | 12/1992 | Sakamoto | 475/277 |
| 5,176,592 | 1/1993 | Nakawaki et al. | 475/278 |
| 5,195,036 | 3/1993 | Kimura et al. | 364/424.1 |
| 5,224,907 | 7/1993 | Shirataki | 475/205 |
| 5,320,000 | 6/1994 | Marusus et al. | 477/154 |
| 5,334,117 | 8/1994 | Ito | 475/276 |
| 5,553,694 | 9/1996 | Schulz et al. | 364/424.08 |

*Primary Examiner*—Kevin J. Teska
*Assistant Examiner*—Tan Nguyen
*Attorney, Agent, or Firm*—Frank G. McKenzie; Roger L. May

[57] ABSTRACT

A multiple ratio transmission having a main gear unit with at least three forward driving ratios and a single reverse drive ratio and a simple planetary gear unit in series with the main gear unit, the simple planetary gear unit being downshifted and the main gear unit being upshifted on an upshift from a first intermediate ratio to a higher intermediate ratio, the simple planetary gear unit being upshifted and the main gear unit being downshifted on a downshift from the higher intermediate ratio to the first intermediate ratio.

16 Claims, 15 Drawing Sheets

GEAR RATIO: 2.474

GEAR RATIO: 1.855

GEAR RATIO: 1.474

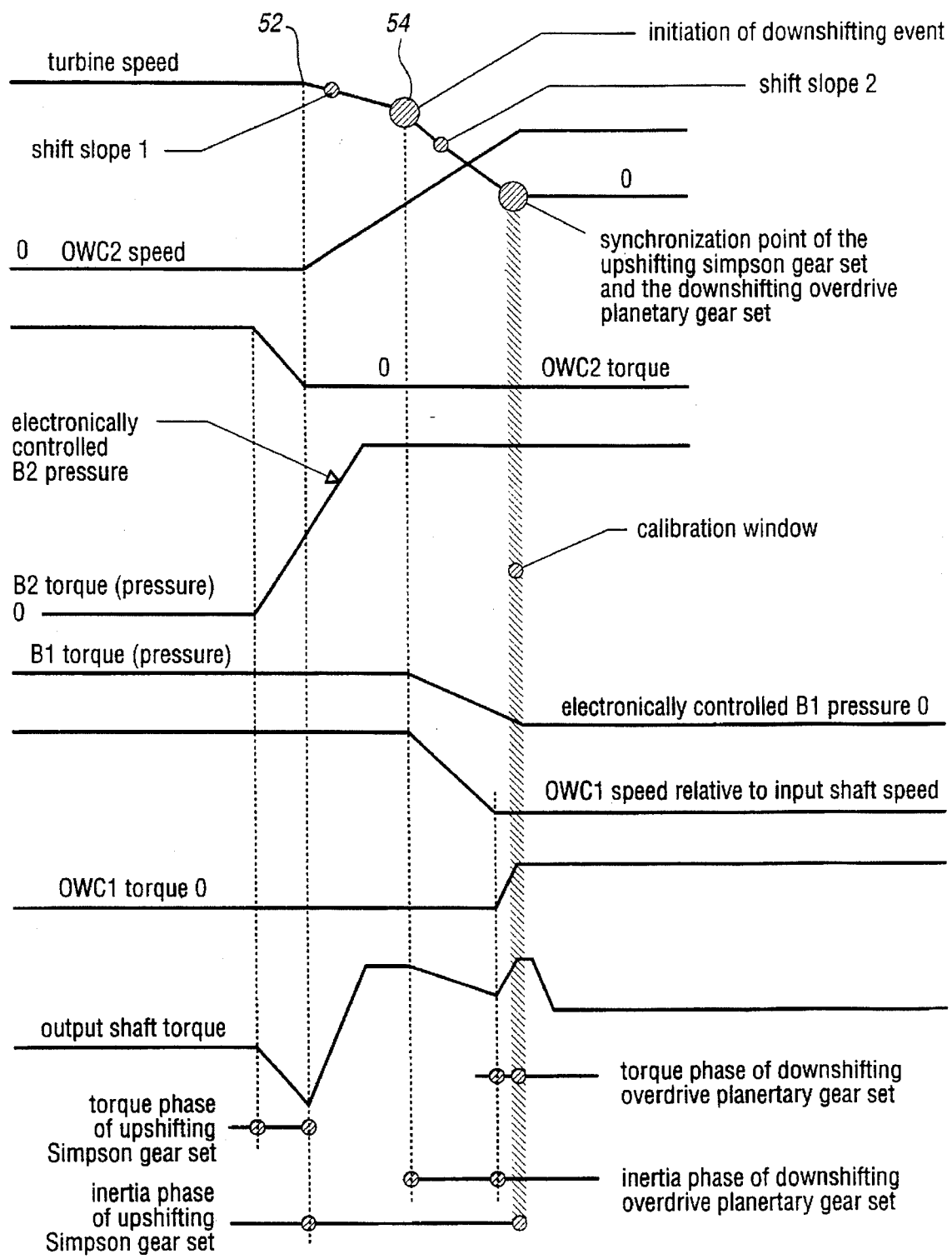

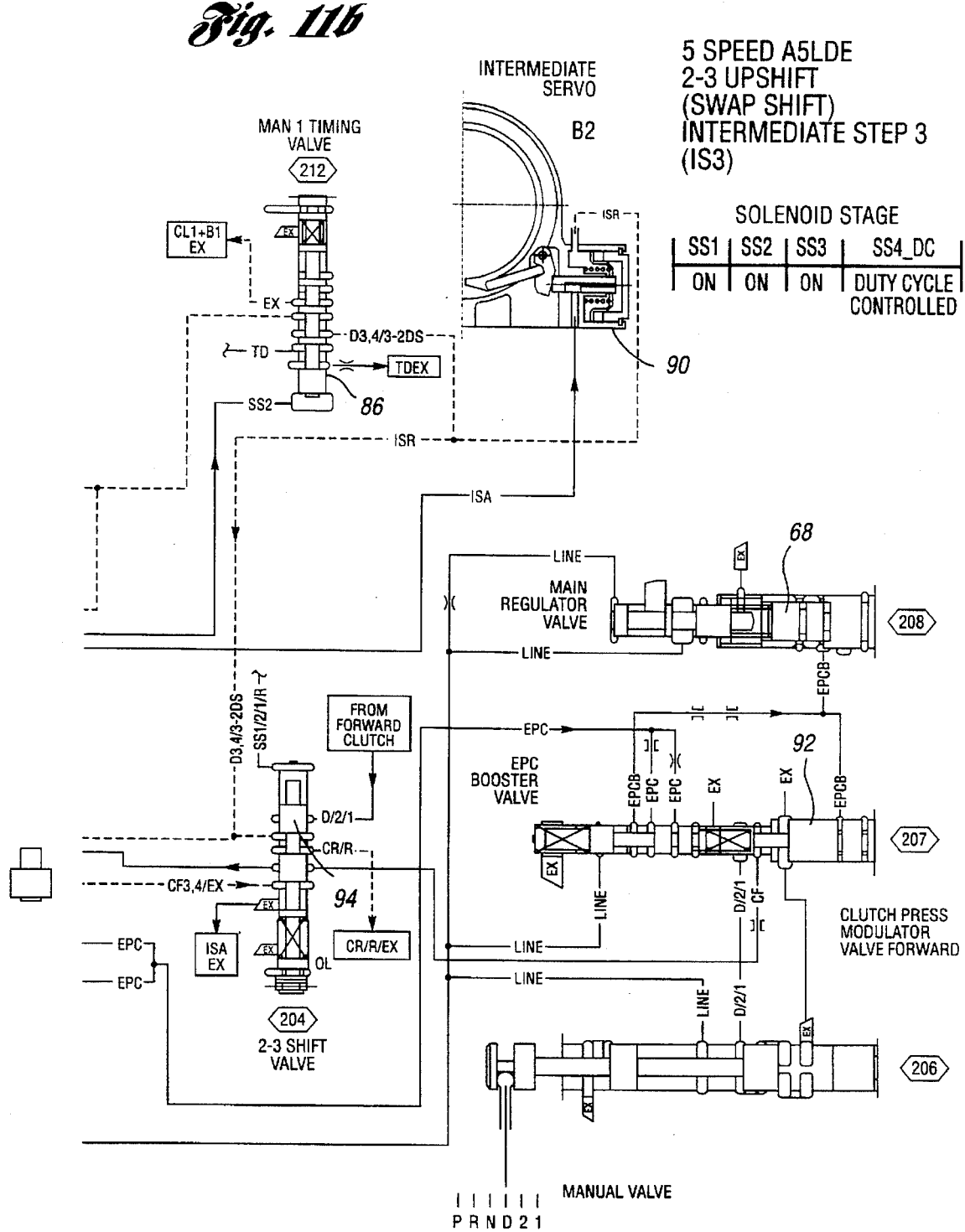

MULTIPLE RATIO TRANSMISSION WITH SWAP-SHIFT CONTROLS

TECHNICAL FIELD

An automatic transmission for an automotive vehicle comprising separate planetary gear units and controls for effecting upshifting one gear unit while downshifting the other gear unit in timed relationship.

BACKGROUND OF THE INVENTION

We have disclosed in co-pending patent application Ser. No. 08/323,464, filed Oct. 14, 1994 now abandoned, a four-speed ratio transmission for use in an automotive vehicle having an internal combustion engine. That transmission is disclosed also in U.S. Pat. No. 4,966,050. The '464 application and the '050 patent are assigned to the assignee of the present invention.

The transmission disclosed in the '050 patent has four forward driving ratios. The torque flow paths for the transmission gearing are defined by a Simpson gearset and a simple planetary gearset, both gearsets being situated between the turbine of a torque converter and the torque output shaft. The Simpson gearset establishes three forward-driving torque ratios and the simple planetary gear unit, acting in cooperation with the Simpson gearset, establishes an additional ratio. A friction brake for the reaction element of the simple planetary gear unit is used to establish a torque reaction and an overrunning coupling establishes torque flow between two elements of the simple planetary gear unit.

A second overrunning coupling in the Simpson gearset establishes a non-synchronous ratio shift. Forward engagement is achieved by engaging a forward clutch during a shift from neutral to drive. A separate reverse engagement clutch is used to establish a torque flow path for reverse.

Ratio changes on upshifts as well as downshifts in the transmission gearing are controlled electronically to establish optimum shift quality.

SUMMARY OF THE INVENTION

The present transmission has features that are common to the transmission disclosed in the '050 patent identified above, but it includes an additional gear ratio. That ratio is greater than the lowest ratio of the four-speed gearing of the '050 patent, but it is less than the second ratio of the four-speed gearing. Ratio changes in our improved five-speed transmission are controlled by an electronic microprocessor, which develops signals in response to operating variables of the driveline of the vehicle to actuate and to release four shift solenoids. The shift solenoids, in turn, control shift valves. A variable force solenoid controls pressure modulator valves for shift calibration. The input signals for the microprocessor have corresponding signals in the four-speed transmission of the '464 patent application and the '050 patent, but additional input signals are included. The principal additional signal is the overdrive brake drum speed (ODS). Another additional signal is output shaft speed (OSS).

On an upshift from the second ratio to the third ratio, the gearing elements function to relieve reaction torque on one gear component and to apply a reaction torque to a companion gear element. The 2-3 upshift involves a downshift of an auxiliary overdrive simple planetary gearset while a Simpson gearing is upshifted. Both of these shifts are synchronized without losing capacity of the affected elements during the shift interval. This shift control is referred to as a "swap-shift".

Following initiation of the inertia phase of the upshifting event, the gear ratio of the overall shifting event is monitored. When a predetermined portion of the upshifting event is completed, the downshifting of the overdrive set is enabled. The ratio changing characteristics of the simple planetary gear unit and the compound gearing of the Simpson gearset thus are controlled by the microprocessor so as to synchronize the shift and to complete the shifting event before the completion of the inertia phase of the upshifting Simpson gearing.

As in the case of a conventional automatic transmission, ratio changes occur in response to solenoid actuated shift valves that selectively distribute actuating pressure to pressure operated brake servo and pressure operated clutches. The improved control system of our invention is capable of using the solenoid for one of the shift valves to effect pressure control for a brake servo involved in an upshift as well as to effect selective servo pressure distribution during a ratio change. This multiplexing of functions simplifies the control system, and makes possible a minimum number of valve elements.

BRIEF DESCRIPTION OF THE DRAWINGS

FIG. 3 is a timing chart showing the turbine speed, the pressures in the brake servos, the overrunning coupling speeds, and the output shaft torque during a 2-3 upshift;

FIGS. 11a and 11b show a schematic illustration of a portion of the control valve system including the valve elements that effect a 2-3 upshift (intermediate step 3);

DESCRIPTION OF THE PREFERRED EMBODIMENT

Figure 1:
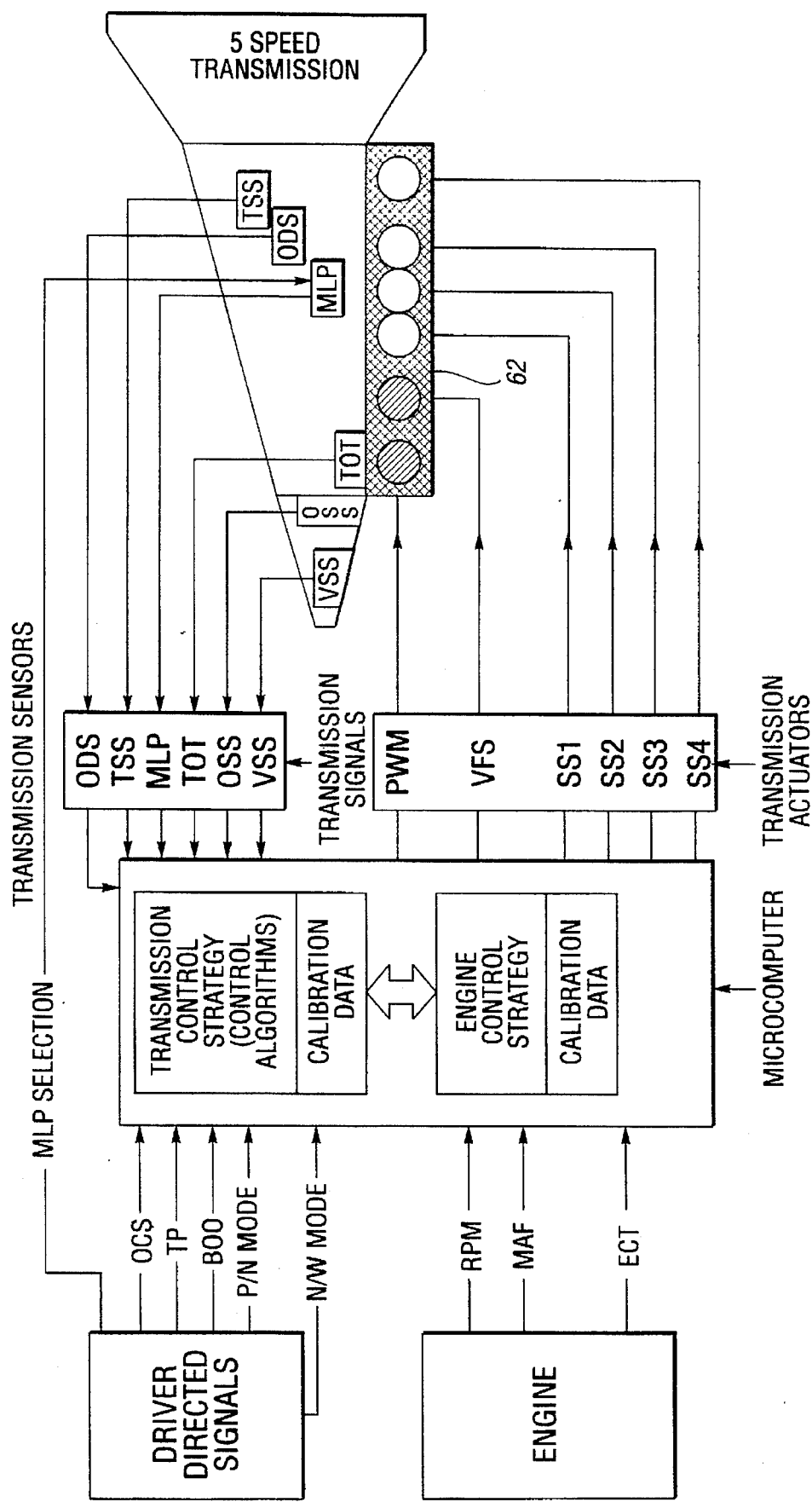
FIG. 1 is a schematic representation of the transmission control system including a microprocessor transmission actuator and the hydraulic control unit.

The transmission of the present invention has features that are common to the four-speed transmission of U.S. patent application Ser. No. 08/323,464. Unlike the gearing of the four-speed transmission, however, the gearing of the present invention effects an upshift to the next higher ratio by downshifting the simple planetary gear unit located between the converter and the Simpson gearset. This produces an underdrive ratio that has no counterpart in the four-speed transmission.

The gear ratio of the simple planetary gear unit times the gear ratio of the Simpson gearset, in a preferred embodiment of the invention, is 1.855 (i.e., 2.474×0.75).

The following chart shows the ratio spread for the five-speed transmission of the invention and the ratio spread for a four-speed transmission, each having a common simple planetary gear unit:

| FIVE-SPEED TRANSMISSION | | FOUR-SPEED TRANSMISSION | |
|---|---|---|---|
| GEAR | GEAR RATIO | GEAR | GEAR RATIO |
| 1ST | 2.474 | 1ST | 2.474 |
| 2ND | 1.855 | — | — |
| 3RD | 1.474 | 2ND | 1.474 |
| 4TH | 1.0 | 3RD | 1.0 |
| 5TH | 0.75 | 4TH | 0.75 |

The additional ratio of 1.855 does not exist in the four-speed transmission. The third, fourth, and fifth gear in the five-speed transmission of the invention are equivalent, respectively, to the second, third, and fourth gears in the four-speed transmission. The additional ratio of 1.855 is obtained by engaging the overdrive planetary gearset while the Simpson gearing is in first gear.

The gear change from second gear to third gear involves downshifting the overdrive planetary gearset and upshifting the Simpson set. This requires synchronizing the release of the sun gear reaction brake for the simple planetary gear unit with the application of the sun gear reaction brake for the Simpson gearset during the upshifting event. This is called a SWAP-SHIFT. Similarly, the 3-2 downshift and the 4-2 downshift involve downshifting of the Simpson gearset and the upshifting of the simple planetary gear unit. These downshift events also are synchronized.

The remaining gear changes for the four-speed transmission and the five-speed transmission of the invention are similar, one with respect to the other. The swap-shift control therefore will be described in detail whereas the other ratio shifts will be described only generally. Reference may be made to the co-pending '464 application, identified above, for a particular description of these other ratio shifts.

Control System

The electronic control system for the transmission of the present invention is a hybrid system in which solenoids, actuated by an enhanced microprocessor controller, control both gear selection and system pressure buildup, the latter being disclosed in the co-pending '464 application identified above. The different friction elements (bands and clutches) are applied and released by hydraulic pressure determined by a hydraulic control unit (main control assembly). This hydraulic control unit contains four shift solenoids, shift valves, one variable force solenoid and pressure modulator valves for shift execution. The transmission control strategy decides the conditions under which the transmission is operated based on various signal inputs generated by the driver, by the engine and by the transmission itself.

FIG. 1 shows a signal flow overview for the transmission. The shift solenoid and shift valve configuration is generally similar to the four-speed transmission of the co-pending '464 application. As far as the signals are concerned, two additional signals have been added, which are the overdrive drum speed (ODS) and the output shaft speed (OSS).

The following signals are used by the transmission control strategy to execute the 2-3 shift, the 3-2 shift and the 4-2 shift. The signals are generated from the following inputs:

A) Driver:
  OCS, TP
B) Transmission:
  VSS, TSS, MLP, TOT, ODS, OSS
C) Engine:
  N, MAF The control algorithms of the transmission strategy determine in which manner the 2-3 upshift and the 3-2/4-2 downshift are executed based on the input signals and calibration data. The transmission operation during swap-shift execution is basically broken down into the following two major events:

1) shifting event, and
2) clutch capacity determination.

The following actuators are responsible for execution of these operating events:

3 ON/OFF solenoids for shifts (SS1–SS3)
1 VFS for clutch capacity
SS4 for overdrive band capacity control, which may be a duty-cycled ON/OFF solenoid.

The transmission actuators convert the electrical signals generated from the control algorithm into either a hydraulic signal pressure or pressures directly applied to clutches or brake bands. Shift valves and modulator valves are actuated by these signal pressures. It is the purpose of these shift valves to release or to apply hydraulic pressure for the torque transmitting elements (clutches and bands). The pressure modulator valves adjust the amount of frictional capacity applied on the friction elements.

Transmission Torque Flow (General)

Figure 2A:
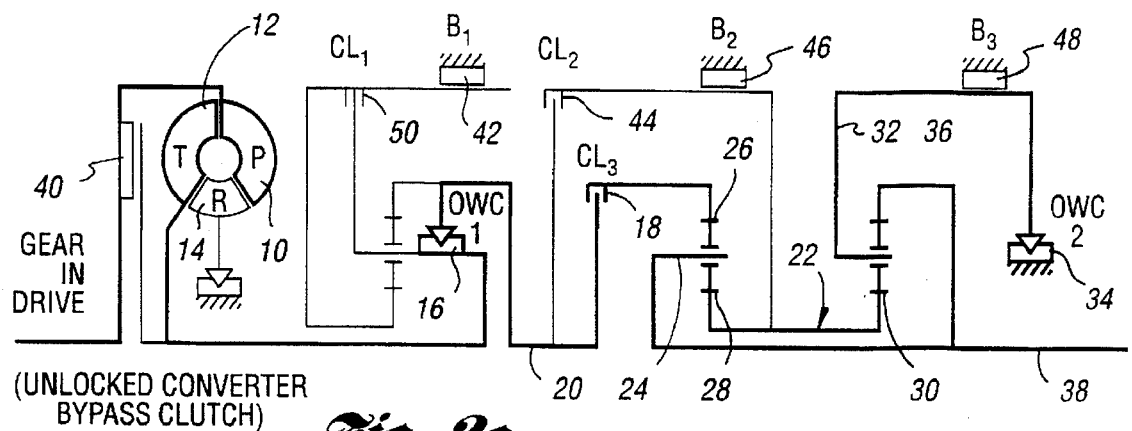
FIGS. 2a, 2b and 2c are schematic representations of a torque flow path for the transmission of our invention when the transmission is conditioned for first gear operation, second gear operation, and third gear operation, respectively.
Figure 2B:
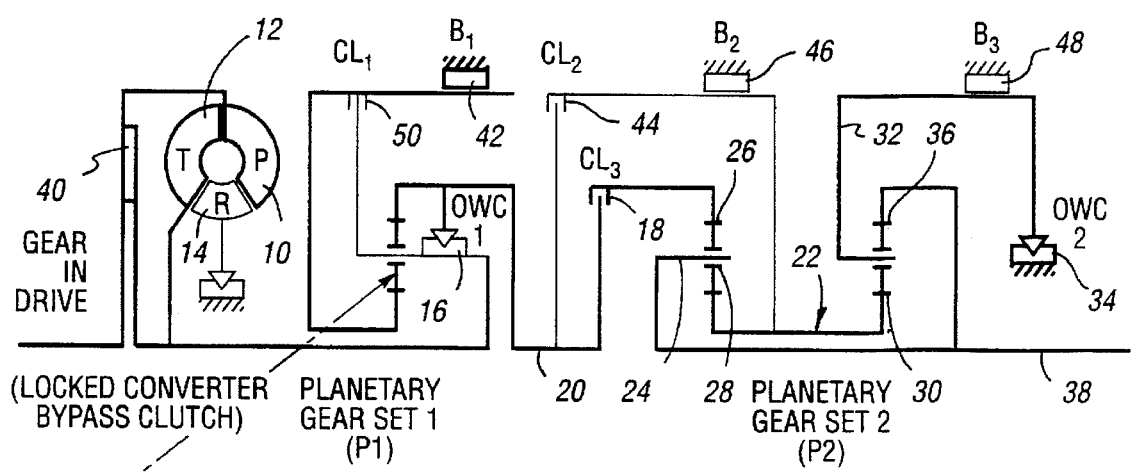
Figure 2C:
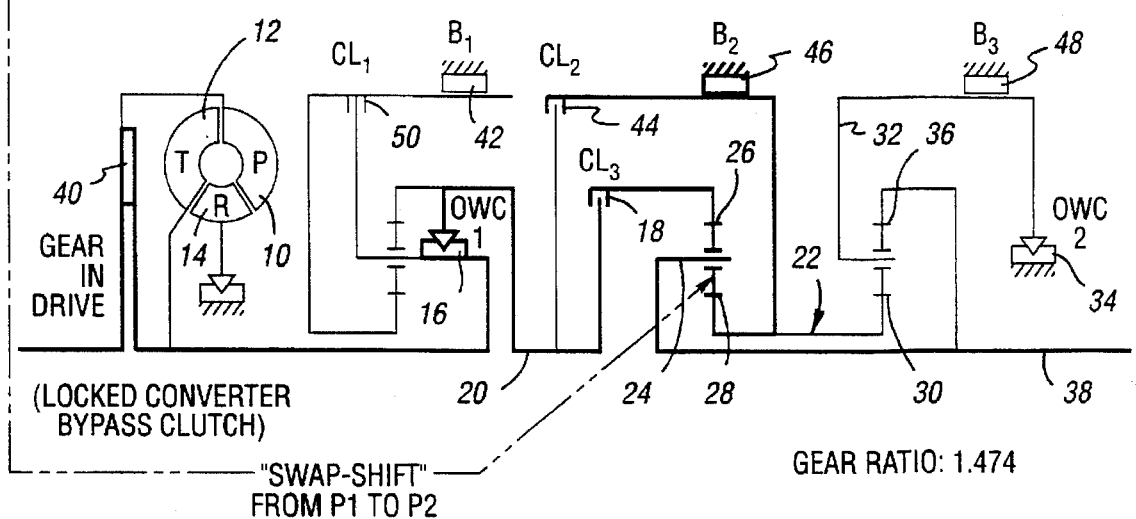

The torque flow is generally similar to the previously mentioned four-speed transmission except that the overdrive planetary gearset is engaged in first gear to generate the 1.855 gear ratio. FIGS. 2a–2c show the torque flow only in the first three gears; which are first, second, and third gears. The fourth gear is the same as third gear in the four speed transmission and the fifth gear is the same as fourth gear in the four speed transmission.

Torque Flow-First Gear in DRIVE

Engine torque is delivered to the pump housing; i.e., the torque converter impeller 10. The converter impeller is a centrifugal pump that accelerates fluid inside of the torque converter toward the turbine blades 12. The accelerated oil is then decelerated over the turbine blades, and the remaining oil is redirected over the reactor 14 back into the impeller, which achieves a torque multiplication effect. From the input shaft, the torque is transmitted to OWC1, which holds the reactor against rotation in the rotational direction of the engine and overruns in the opposite direction.

The engaged clutch CL3, shown at 18, carries the torque from the center shaft to the input element of the Simpson planetary gear arrangement 22 (see FIG. 2a). The torque is distributed to the ring gear and is then split into two components. One torque component is delivered over the planetary carrier 24 to the output shaft, which turns in the same rotational direction as the ring gear 26. The sun gear 28 carries the remaining component of the torque in reverse motion to the rear sun gear 30 of the Simpson planetary gearset.

The planetary carrier 32 of the rear planetary gearset is held by OWC2, shown at 34. The torque delivered by the sun gear 30 is then transmitted over the planetaries to the ring gear 36, which reduces the velocity and multiplies the torque to the output shaft 38. This arrangement provides a 2.474 gear ratio.

In coast mode, OWC1 and OWC2 are overrun and free-wheeling is in effect. The converter clutch 40 stays open until no torque multiplication occurs. It can be locked afterward.

Torque Flow-Second Gear in DRIVE

Second gear is generated by the engagement of brake 42 (B1), which is the overdrive band. CL2, B2, and B3, shown at 44, 46 and 48, respectively, are still disengaged. B1 (see FIG. 2b) carries 0.25*engine torque as a reaction torque. The sun gear of the overdrive planetary gearset is decelerated to zero speed and generates an overall gear ratio of 1.855, which consists of the first gear ratio 2.474 times the overdrive gear ratio, which is 0.75. The engagement of CL1, shown at 50, is hydraulically inhibited when B1 is applied. With the engagement of B1, the reaction torque on OWC1 is reduced until the one-way clutch overruns. The converter clutch can be locked or unlocked in second gear depending on the driving condition.

Torque Flow-Third Gear in DRIVE

The torque flow is the same as in second gear, except that B2 is applied and B1 is released. With the engagement of B2, the sun gear speed of the rear Simpson set 22 is reduced to zero. Here, the brake band (B2) serves as a reaction element for the front gear unit of the Simpson planetary gearset. An output torque multiplication of 1.474 occurs by holding 0.474 *engine torque as a reaction torque. The output of the rear Simpson planetary gearset is zero since the sun gear has zero speed. The converter clutch can be locked or unlocked in third gear depending on the driving condition.

The gear change from second to third is illustrated in FIG. 2c. The gear ratio change is accomplished by releasing B1 and applying B2 at the same time. This disengages planetary gearset P1 and engages planetary gear set P2. During a downshift, the engaging sequence is reversed.

Synchronous Shift Control of 2-3 Upshift (SWAP-SHIFT) and a 3-2/4-2 Downshift (SWAP-SHIFT)

The transmission has the following additional types of synchronous shifts:

| SHIFTS | SYNCHRONOUS |
|---|---|
| 2-3 | Reaction-to-Reaction (B1/OWC1 to B2/OWC2) |
| 3-2 | Reaction-to-Reaction (B2/OWC2 TO B1/OWC1) |
| 4-2 | Drive-to-Reaction (CL2 to B1/OWC1) |

This section describes the shift dynamics of synchronous 2-3 upshifts and 3-2/4-2 downshifts. Pressure control and the resulting torque disturbance of the electronic control system is described in general to accomplish the SWAP-SHIFT. How the electronic control system executes the upshifts and downshifts is described subsequently.

Synchronous Upshift Control, 2-3 Upshift (SWAP-SHIFT)

The synchronous 2-3 upshift is a reaction-to-reaction shift. Reaction-to-reaction means, in this case, a change from one reaction element to another reaction element. As mentioned earlier, the 2-3 upshift of the five-speed transmission is a gear ratio change where two independent, in-series, compounded planetary gearsets are upshifted and downshifted, respectively. In this case, the overdrive planetary gearset (P1) is downshifted and the Simpson planetary gearset 22 is upshifted. The ultimate goal is to synchronize both shifting events without losing capacity of one of the affected elements at the finishing point of the upshifted Simpson gearset (see FIG. 3).

The shift is initiated by engaging B2 and increasing B2 capacity. This reduces the OWC2 torque down to zero level. The output shaft torque follows the OWC2 torque up to the point where B2 torque is equal to the reaction torque of OWC2. At this point, the output shaft torque follows the B2 pressure characteristic and OWC2 starts to rotate, as shown at 52 in FIG. 3. The inertia phase of the upshifting event is initiated and "shift slope 1" is generated. When a certain fraction of the upshifting event has been reached, the downshifting event of the overdrive planetary gearset is enabled. This is accomplished by reducing B1 capacity. The output shaft torque characteristic follows the B1 pressure characteristic, and the OWC2 speed relative to input shaft speed is reduced. A second shift slope, called "shift slope 2", is started at 54 (see FIG. 3). When the inertia phase of the downshifting event is completed, OWC2 carries torque. The torque phase of the downshifting overdrive planetary gearset is then complete.

The electronic control system has to satisfy the following requirements in order to accomplish satisfactory 2-3 upshift quality:

B1 capacity has to be controlled electronically,

B2 capacity has to be controlled electronically,

B1 and B2 have to be controlled independently,

The electronically controlled B1 and B2 characteristics have to be able to control capacity with regard to OWC1 and OWC2 engagement quality, Turbine speed has to be monitored, OWC1 acceleration and deceleration has to be monitored by sensing CL1 speed, which is overdrive drum speed, and Electronic control of upshift and downshift execution.

Each one of the above-mentioned items affects the upshift quality. The synchronization of both shifting events has to be completed at the completion, or just before the completion, of the inertia phase of the upshifting Simpson set 22. The engagement of OWC2 has to be controlled by accumulating the B1 capacity. This requires electronic control of band capacity and electronic control of upshift and downshift execution as well as monitoring the upshifting and downshifting events. The synchronization has to take place within a defined calibration window (see FIG. 3) in order to prevent a gear ratio change into the next higher gear. This can occur when the downshifting takes place too late. Similarly, if the downshifting event takes place too early, capacity loss takes place since the transmission shifts back into first gear. A conventional, hydraulically-controlled transmission is not capable of executing these two upshifting events.

Synchronous Downshift Control, 3-2/4-2 Downshift (SWAP-SHIFT)

The synchronous 3-2/4-2 downshift is reaction-to-reaction (3-2) and a drive-to-reaction (4-2) shift. Drive-to-reaction means that a rotating clutch is shifted to a reaction element, which is B1. This is the inverse of the 2-3 upshift in which the overdrive planetary gearset is downshifted as the Simpson gearset is upshifted. On a downshift, the overdrive planetary gearset is upshifted, whereas the Simpson gearset 22 is downshifted. In the case of a 3-2 downshift, B2 is released; and in the case of a 4-2 downshift, CL2 is released. Here, the upshifting event of the overdrive planetary gearset must take place first; and when B1 carries full capacity, the downshifting of the Simpson set can be initiated.

Figure 4:
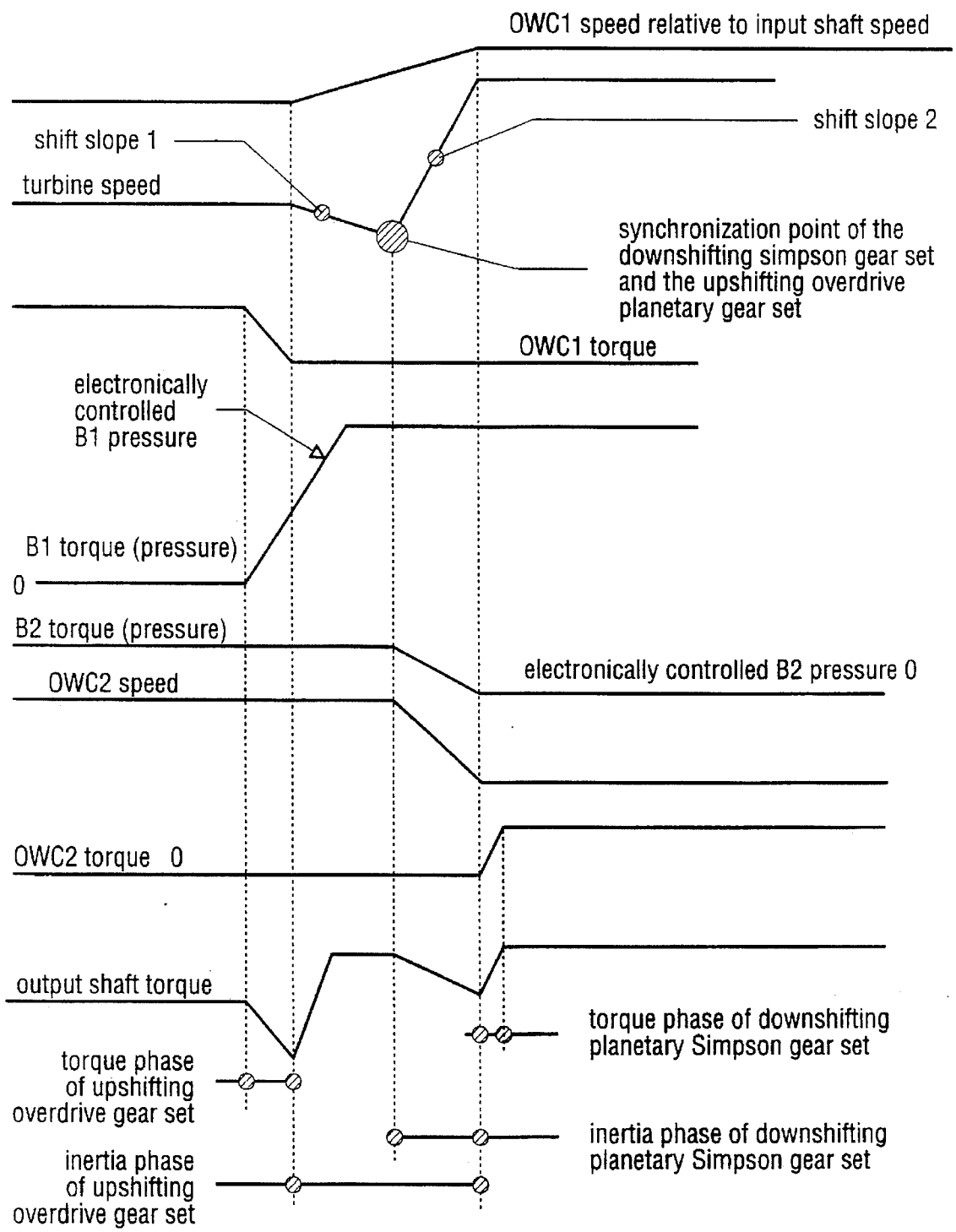
FIG. 4 is a timing chart, similar to that of FIG. 3, showing a 3-2 downshift event.

The graph of FIG. 4 illustrates this shifting process. B1 pressure is increased, which reduces OWC1 torque to zero. The inertia phase of the upshifting overdrive planetary gearset is initiated when OWC1 torque is zero, generating "shift slope 1". The transmission shifts first to the next possible higher gear. The synchronization point is determined by the amount of the overdrive upshift progression. When the synchronization point has been reached, the downshifting event of the Simpson planetary gearset is initiated. B2 pressure is released and OWC2 speed is reduced by input shaft torque and the "shift slope 2" is started. Here again, the B2 pressure characteristic must be capable of accumulating torque to ensure a smooth OWC2 engagement. The downshift is complete when OWC2 transmits full torque.

The electronic control system must satisfy the same requirements as those identified above. B1 and B2 have to be electronically controlled; and they require independent control systems. Both B1 and B2 pressure characteristics should be able to accumulate for smooth one-way clutch engagements. The synchronization point has to be detected by monitoring turbine speed and overdrive drum speed, which basically represents the OWC1 speed relative to input shaft speed.

The electronic control system of the five-speed transmission of the invention is capable of controlling the above described shifts. The complete control system and its functional requirements, explained above, are described subsequently.

Figure 10:
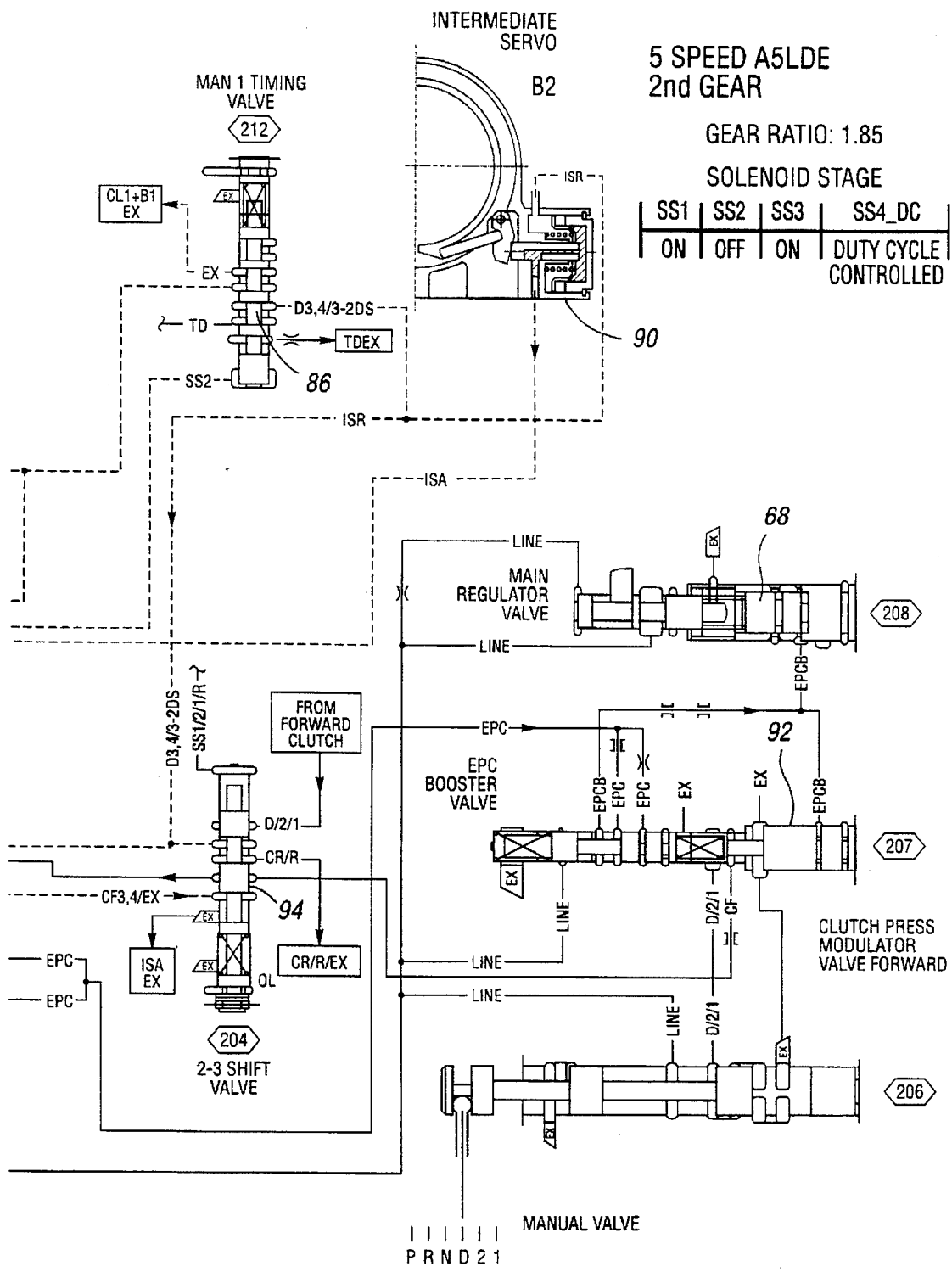

The charts on pages 6, 24 and 37, as well as FIGS. 10 and 11b, show the functional matrices for the five-speed transmission. These functional matrices represent the gear ratios and the active solenoid stages dedicated to the gear ratios for swap shifts.

Manual Lever Position: DRIVE

In addition to the four-speed solenoid stages, two solenoid stages have been added to achieve the five-speed ratios. These are second gear solenoid stage and intermediate step 3 (IS3). This intermediate step 3 is used to initiate the 2-3 upshift and the 3-2 downshift. The solenoid stages for first, third, 1S1, 1S2, fourth and fifth gears are the same as those stages found in the previously described four-speed transmission except that third, fourth, and fifth gear are equivalent to second, third, and fourth gear for the four-speed transmission.

Figure 5:
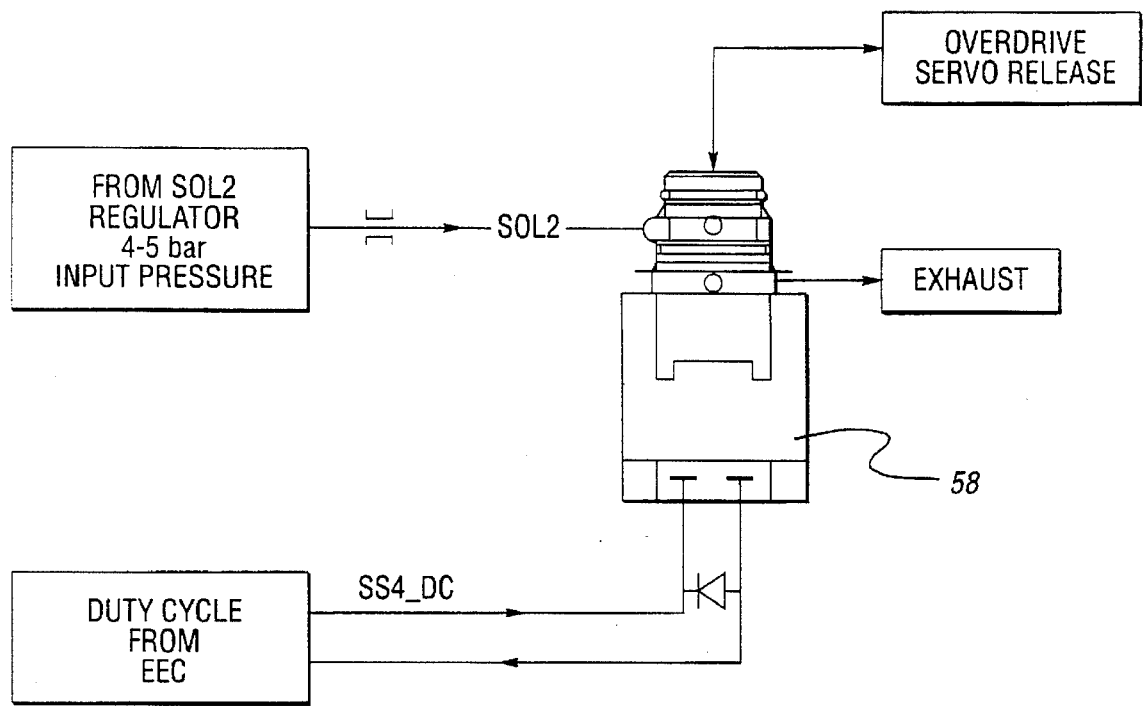
FIG. 5 is a schematic representation of a shift solenoid that controls the application and release of the overdrive servo.
Figure 9:
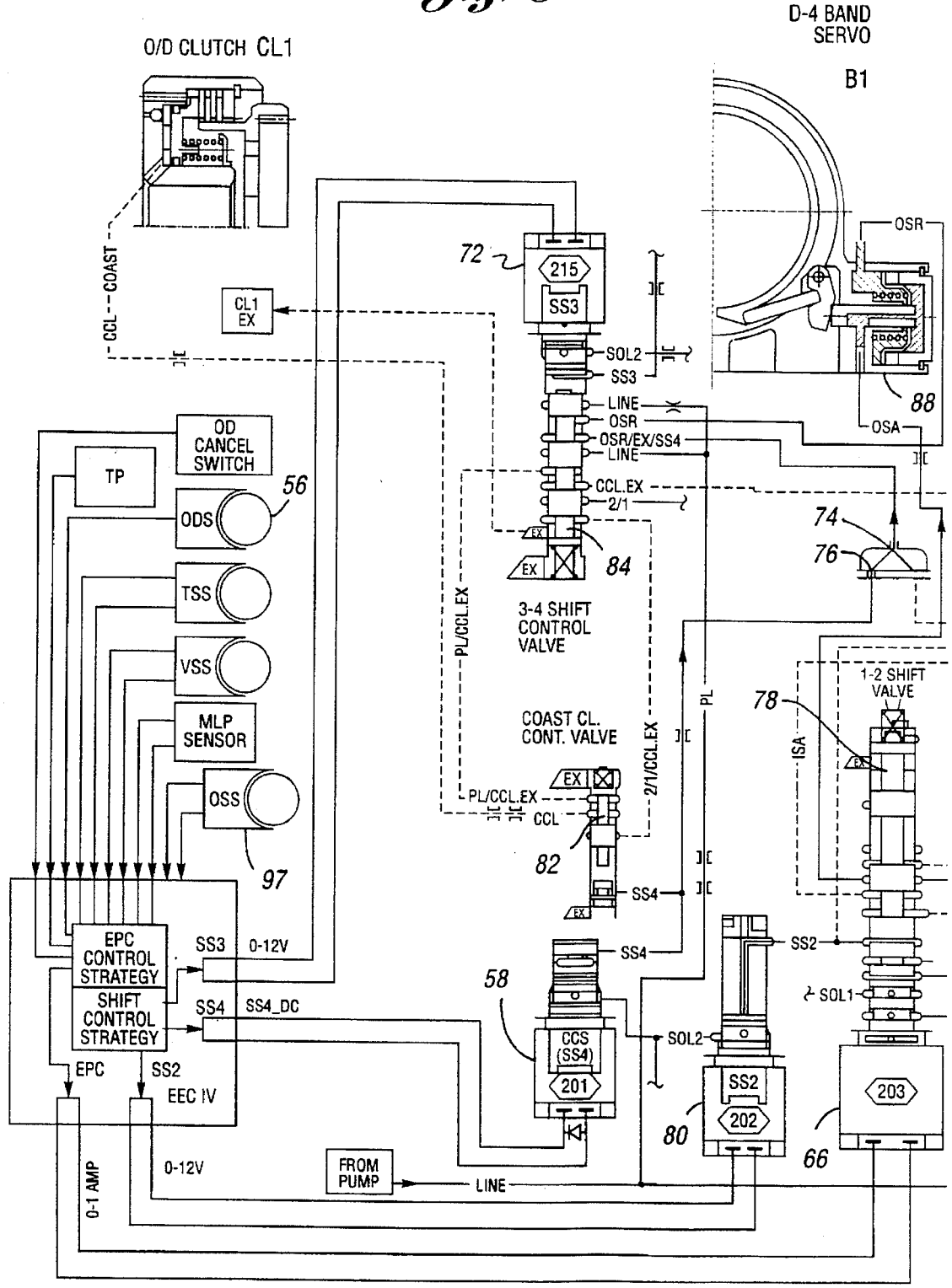
FIGS. 9 and 10 show a portion of the control valve circuit for the five-speed transmission of FIGS. 2a, 2b and 2c illustrating the states of the valve elements of the system in second gear.

The control system contains three shift solenoids SS1, SS2, and SS3 for shift execution. SS2 and SS3 are seen in FIGS. 10–12. In the five-speed transmission of the invention, eight solenoid stages are required to realize first, second, 1S3, third, 1S2, 1S1, fourth, and fifth gear. Shift solenoid SS4, seen at 58 in FIGS. 5 and 9, is used for the overdrive cancel function and for overdrive band capacity control. This will be explained subsequently.

The electronic-mechanical interface (seen in FIG. 1) contains also the hydraulic control system which transforms the solenoid stages into shifting action. This description is concerned principally with second gear stage, intermediate step 3 and third gear stage.

Manual Lever Position: MAN1/MAN2

The solenoid stages in these positions are common to those of the four-speed transmission. The only difference is that third gear in the five-speed transmission of the invention is equivalent to second gear in the four-speed transmission.

Manual Lever Position: PARK; REVERSE; NEUTRAL

The solenoid stage in these positions is the first gear stage, which is equivalent to that of the four-speed transmission.

Sensors and Actuators

The sensors and actuators are common to those of the four-speed transmission. There are two additional transmission sensors added, which are the overdrive drum speed sensor (ODS) and the output shaft speed sensor (OSS). With the output shaft speed and overdrive drum speed signals, along with the turbine speed signal (TS), all velocities and ratios for the overdrive planetary gearset, as well as the Simpson planetary gearset, are determined.

Overdrive Drum Speed Sensor (ODS)

Overdrive drum speed sensor 56 (ODS) senses the speed of the overdrive drum (CL1). It is a variable reluctance sensor. The overdrive drum contains 24 teeth in order to trigger the overdrive drum speed signal. The overdrive drum is connected to the sun gear of the overdrive planetary gearset, and the overdrive drum speed sensor (ODS) monitors the sun gear speed. The sensor has the following characteristic data:

minimum detectable signal: 150 RPM with ±340 mV amplitude, maximum signal allowed: 7000 RPM ±90 V amplitude, For noise immunity, the sensor 56 needs a separate signal wire to the EEC module.

The ODS sensor monitors the sun gear speed of the overdrive planetary gearset to effect control of the overdrive band capacity during a 2-3 upshift as well as the 3-2/4-2 downshifts. It will also be used for 5-4 downshifts and 4-5 upshifts.

Output Shaft Speed Sensor (OSS)

The output shaft speed sensor 97 (OSS), which senses the speed of the output shaft, is a variable reluctance sensor. The output shaft trigger wheel contains 8 teeth in order to trigger the output shaft signal.

The sensor OSS has the following characteristic data:

minimum detectable signal: 150 RPM with ±340 mV amplitude, maximum signal allowed: 7000 RPM with ±90 V amplitude;

for noise immunity, the sensor 56 needs a separate signal wire to the EEC module.

The output shaft speed sensor 97 is used to generate a more accurate signal compared to the vehicle speed sensor, shown at 99 in FIG. 10a. The output Shaft speed signal is required to determine a reliable value for the transmission ratio variable (RT_TRANS).

Shift Solenoid SS4

The shift solenoids are used to transform an electrical signal of zero to 12 V into an output pressure of zero to 5 bar. With the four-speed transmission, the shift solenoid 58 (SS4), seen in FIG. 5, is used to control the coast clutch when the overdrive cancel function is executed. With the five-speed transmission, shift solenoid 58 (SS4) is used in addition to the overdrive cancel function as a capacity control actuator for the overdrive band capacity adjustment (see FIG. 6). The shift solenoid is applied with a duty cycled electrical input signal similar to the PWM-solenoid for the converter clutch. The input pressure is SOL2 pressure, which varies between 4–5 bar.

Figure 6:
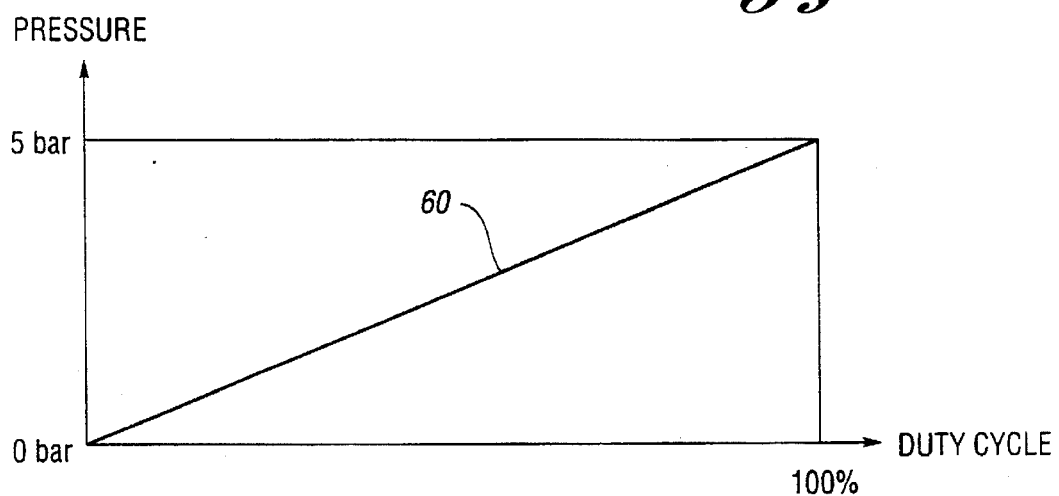
FIG. 6 is a plot of the transfer function for the shift solenoid illustrated in FIG. 6 wherein servo pressure is plotted against duty cycle.

This input pressure is modulated by the duty cycle input into a transfer function as shown in the graph of FIG. 6. The transfer function may be represented as a straight line 60. The output pressure is applied to the overdrive servo release side, thus controlling the overdrive band B1 capacity. SS4 now acts as an ON/OFF device as well as a pressure regulator system.

Control Strategy Overview (Software)

The basic control strategy of the invention in some respects is common to that of the four-speed transmission.

The new strategy for the five-speed transmission is explained in detail subsequently.

Important Transmission Calculations

Two important transmission calculations, which are common to the four-speed transmission, are listed below:
PCSFTCMPT=percentage shift complete
This calculates the percentage of the gear ratio depending on the old gear and the command gear.

$$PCSFTCMPT=(RT\_TRANS-GRRAT[GR\_OLD])/(GRRAT[GR\_CM]GRRAT[GR\_OLD])$$

RT_TRANS=current calculated gear ratio
GRRAT=gear ratio in each gear
GR_CM=commanded gear
GR_OLD=old gear
RT_TRANS=instantaneous calculated gear ratio
RT_TRANS=NT/NO
NT=turbine speed
NO=output shaft speed Additional further important calculations are added which are specific to the 2-3 upshift execution. These are:
RT_SFT_END=The transmission ratio where the shift solenoid stages are controlled.
This calculation is used to determine, based on calibration data, the transmission gear ratio threshold when the solenoid stages should be changed from the intermediate step 3 (IS3) to third gear.

$$RT\_SFT\_END=GRRAT2+[FNPCSFT23(TP\_REL)*(GRRAT3-GRRAT2)]$$

where
GRRAT2=gear ratio in 2nd gear
GRRAT3=gear ratio in 3rd gear
FNPCSFT23(TP_REL)=function TP_REL versus PCSFTCMPT to determine the percentage shift complete value when the solenoid stages change
TP_REL=relative throttle position
RT_23_TRIG=ratio threshold when capacity control by shift solenoid 58 (SS4) takes place $$RT\_23\_TRG=GRRAT2+[FN23CMPF(NOBART)*(GRRAT3-GRRAT2)],$$

where
FN23CMPF=function NOBART versus PCSFTCMPT to determine the percentage shift complete value when capacity control on the overdrive band should take place
NOBART=output shaft speed
ODS_TRG=target overdrive drum speed $$ODS\_TRG=NOBART*GRRAT3*FNODS\_CMPT(NOBART)$$

This calculates the overdrive drum speed target based on the output shaft speed NOBART and a function NOBART versus a multiplier
FNODS_CMPT(NOBART)=function NOBART versus a multiplier to determine the target overdrive drum speed ODSS_TRG_FG=target overdrive drum speed dependent on the gear ratio
This calculates the target overdrive drum speed as a function depending on actual gear ratio RT_TRANS. The target overdrive drum speed ODSS_TRG is increased and synchronized with the execution of the shift.

$$ODSS\_TRG\_FG=ODSS\_TRG*[(GRRAT2-RT\_TRANS\_RT\_CORR)/-(GRRAT2-GRRAT3)]$$

RT_CORR is a calibratable value used to control the starting point of the ODS_TRG_FG signal in shift interval to enhance upshift and downshift control.

Functional Description of the Five-Speed Transmission Control System

The hydraulic control system as well as the control strategy for the dedicated functions of the transmission now will be described. The hydraulic control system is basically the same as that of the four-speed system, except shift solenoid 58 is controlled differently and the overdrive drum speed sensor 56 is used for feedback control. The functional description includes only the 2-3 upshift control and the 3-2/4-2 downshift control since everything else is common to the four-speed transmission. The hydraulic control system for accomplishing a 2-3 upshift, as well as a 3-2/4-2 downshift, consists of the following hardware components:

valve body and connecting labyrinth 62 (see FIG. 1),
3 ON/OFF solenoids,
SS4 shift solenoid 58,
1 main regulator valve 68 (includes a booster valve),
2 modulator valves,
5 shift valves,
1 variable force solenoid 66,
1 separator plate with connecting holes, and
springs and sleeves.

All these components are used by the hydraulic control system to execute a 2-3 upshift or 3-2/4-2 downshift.

Pressure Buildup System
The pressure buildup system is common to the four-speed transmission, as mentioned above. The detailed description of the four-speed version of the '464 application is incorporated by reference in this disclosure.

Pressure Systems Used For 2-3/3-2/4-2 Shift Control
The hydraulic control system consists of three different pressure systems:
The electronic pressure control systems (EPC/EPCB);
Electronic pressure control with VFS
EPCB boost pressure system
SS4 pressure system (PWM-pressure)
Pressures generated by the manual valve;
The system pressures (PL, CC, SOL1, SOL2);
Main regulator valve system (PL)
SOL1, SOL2 regulator valve system
Clutch pressure modulator forward (CF).

2-3 Upshift System (SWAP-SHIFT)

Hydraulic Control System
The hydraulic control system for controlling execution of a 2-3 upshift is shown in FIGS. 9, 10, 11a, 11b, 12a and 12b.

The new second gear embodied in the five-speed transmission is shown in FIGS. 9 and 10. The solenoid stage is SS1=ON, SS2=OFF and SS3=ON. The shift solenoid (SS4), shown at 58, can be duty-cycle controlled or actuated as an ON/OFF solenoid. During the transition from second gear to third gear, an intermediate step 3 is introduced, which initiates the upshifting event of the Simpson planetary gearset 22.

The following chart shows the solenoid stages during a 2-3 upshift, which are then explained in detail in the following description.

| | Solenoid Stages | SS1 | SS2 | SS3 | SS4 |
| --- | --- | --- | --- | --- | --- |
| 2-3 UPSHIFT SHIFT SEQUENCE | 2nd Gear | ON | OFF | ON | Duty Cycle Controlled |
| | Intermediate Step 3 | ON | ON | ON | Duty Cycle Controlled |
| | 3rd Gear | ON | ON | OFF | OFF |

With the second gear solenoid stage, the overdrive planetary gearset is upshifted, in addition to the first gear ratio of the Simpson sets, giving a gear ratio of 1.85. With shift solenoid 72 (SS3) energized, the 3-4 shift control valve moves into upshift position. This disconnects line pressure from the overdrive servo release (OSR) side and connects the OSR side with the shift solenoid 58 circuitry. This circuitry is called OSR/EX/SS4. With orifice 74 10 closed and orifice 76 opened and with the upshifting of valve 84 in bore 215, the OSR side is connected to the duty cycle controlled shift solenoid 58. The overdrive servo apply side is always applied with CF-pressure produced by the clutch pressure modulator forward in bore 207. When the shift solenoid 58 is turned off or no duty cycle is applied, the OSR release oil is exhausted through shift solenoid 58. This basically produces the capability of independent capacity control of the overdrive band by adjusting the overdrive servo release pressure. This is important when the swap-shift is initiated. The intermediate servo apply side is exhausted over the 1-2 shift valve in bore 203 and the 2-3 upshift valve in bore 204 into the ISA/EX port. The intermediate servo release side and the high clutch CL2 are exhausted also over the 1-2 upshift valve 94 in bore 204 and the 2-3 upshift valve 78 (FIG. 11b) in bore 204 into the CR/R/EX port.

Figure 11A:
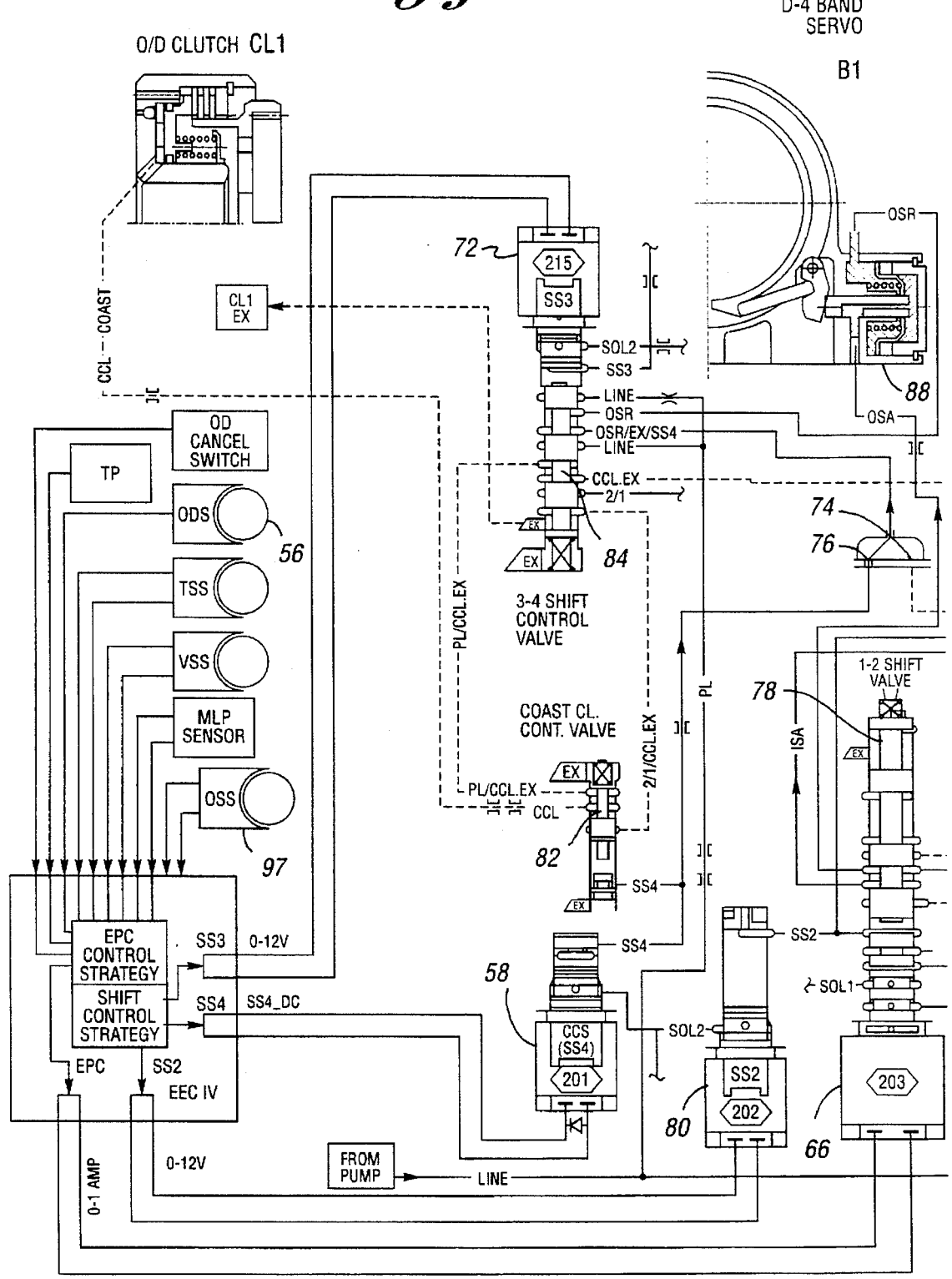

When a 2-3 upshift is initiated, shift solenoid 80 (SS2) is energized. The energized shift solenoid 80 moves the 1-2 upshift valve 78 into upshift position. This is shown in FIG. 11a. The upshifted 1-2 upshift valve 78 connects the intermediate servo apply side (ISA) with CF-pressure and the intermediate servo starts to engage. This initiates the 2-3 upshift by upshifting the Simpson planetary gearset 22, as explainer earlier. Considering the fact that both elements (the overdrive servo as well as the intermediate servo) are applied with CF-pressure, independent capacity control would not be possible if a signal pressure controller were to be used. With the shift solenoid 58 connected to the OSR side, however, independent control of the overdrive band capacity is possible relative to the intermediate band capacity. The transmission is in the intermediate step 3 (IS3) stage.

Figure 12A:
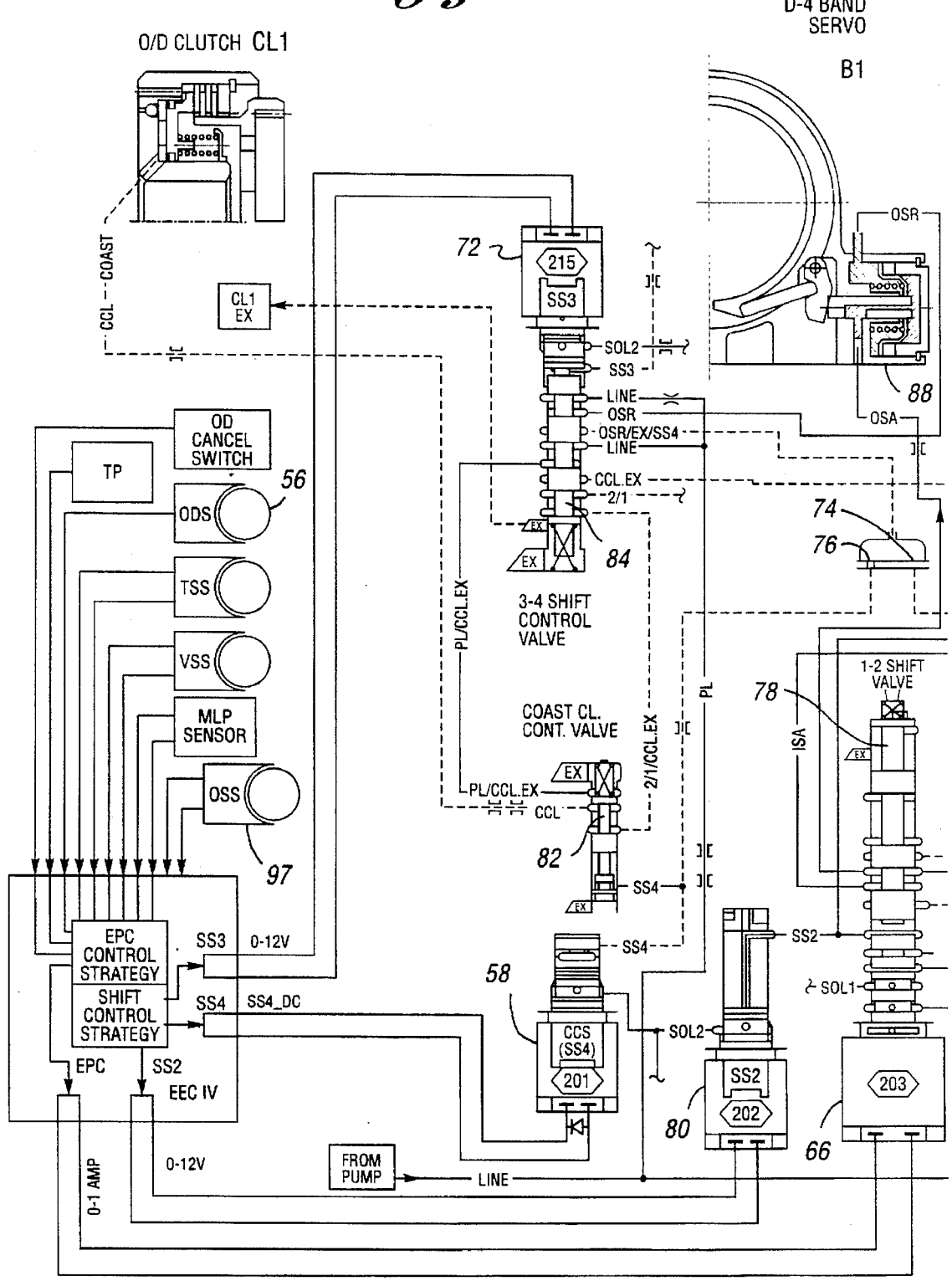
FIGS. 12a and 12b show a schematic illustration of the control valve elements of the control valve system including the valves that effect third gear operation.
Figure 12B:
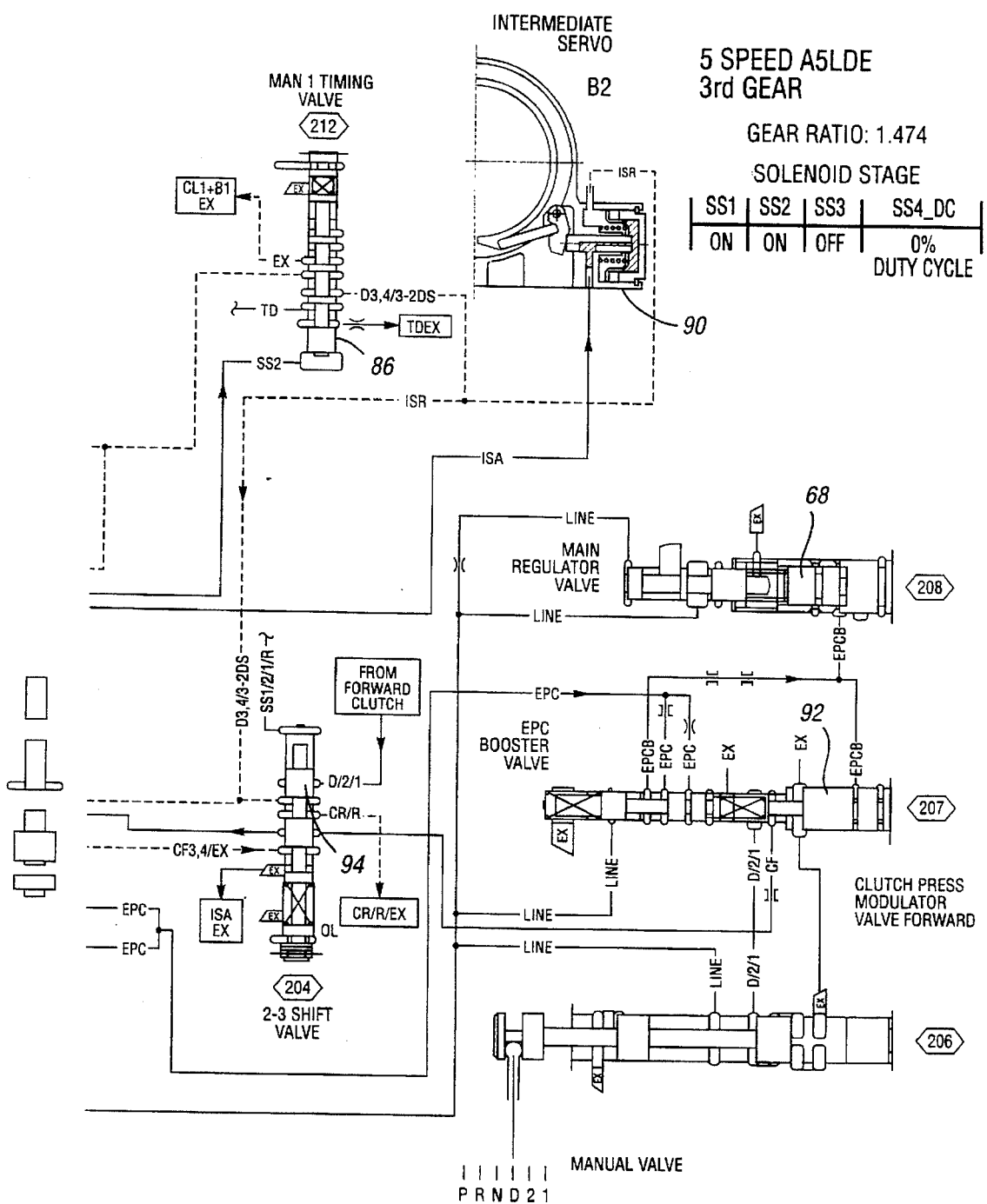

When the intermediate band transmits full capacity, the downshifting of the overdrive planetary gearset is controlled; first of all by controlling the pressure on the overdrive servo release side by applying a duty cycle to shift solenoid 4. This controls capacity of overdrive band 42 and thereby controls the amount of torque applied to OWC1. By monitoring turbine speed (TS) and overdrive drum speed (ODS), the upshifting of the Simpson set 22 and the downshifting of the overdrive planetary gearset can be synchronized. During this OSR capacity control phase, the coast clutch 50 (CL1) is exhausted over the upshifted coast clutch control valve 82 in bore 201 and upshifted 3-4 shift valve 84 in bore 215. At the point where sufficient overdrive band capacity control has been achieved and the transmission approaches the third gear ratio value, the transmission can then shift into third gear completely. The shift solenoid 72 (SS3) is now deenergized and the 3-4 upshift valve 84 in bore 215 moves into downshift position. This is shown in FIG. 12a.

Upon downshifting of valve 84 in bore 215, the overdrive servo release side is disconnected from the shift solenoid 58 (SS4) circuit and line pressure is applied to the overdrive servo release side. The line pressure fully strokes the overdrive band 42 and the downshifting of the overdrive planetary gearset is completed. The duty cycle of the shift solenoid (SS4_DC) then is set to zero. This exhausts the SS4 pressure completely and moves the coast clutch control valve 82 into downshift position. The coast clutch 50 (CL1) is now exhausted over the CCL circuit and the coast clutch control valve in bore 201 through the 2/1/CCL/EX circuit and the downshifted 3-4 shift control valve 84 into the manual 2/1 circuit. The 2-3 upshift then is complete and the gear ratio is 1.474.

Optional Shift Control

The same swap-shift can be controlled in an optional construction without capacity control of the overdrive band. This is accomplished by closing orifice 76 and opening orifice 74. This disconnects the overdrive servo release side from shift solenoid 58 and connects the OSR side over the shift valve in bore 212 to the CL1/B1/EX port. However, this disables the independent control feature of the overdrive band 42, but it produces the option of engaging and releasing the overdrive band through a wide open exhaust. This protects the overdrive band lifetime durability in case of an overloading of the overdrive band using SS4 capacity control. The shift quality, however, will be influenced by this optional shift control method. The same effect is also accomplished without using this optional feature and leaving the shift solenoid turned off.

Control Strategy For 2-3 Upshift

In order to describe the complete control system, including the control strategy, the following parameters during a 2-3 upshift event are identified:

Control strategy:
 GR-DS desired gear,
 GR-CM commanded gear,
 EPC control pressure register,
 FLG_SS_i shift solenoid flag 1
 FLG_SS_2 shift solenoid flag 2,
 FLG_SS_3 shift solenoid flag 3,
 RT_TRANS calculated gear ratio,
 SS4_DC shift solenoid 4 duty cycle,
 TM_23_STRT timer to enable start duty cycle,
 ODS overdrive drum speed,
 N engine speed,
 NT turbine speed,
 NOBART output shaft speed, Hydraulic and transmission parameters:
 SS1 shift solenoid pressure 1,
 SS2 shift solenoid pressure 2,
 SS3 shift solenoid pressure 3,
 OSA overdrive servo apply pressure,
 OSR overdrive servo release pressure,
 ISA intermediate servo apply pressure, HCDS high clutch drum (CL2) speed (not calculated by control strategy), and Output shaft torque.

Figure 13:
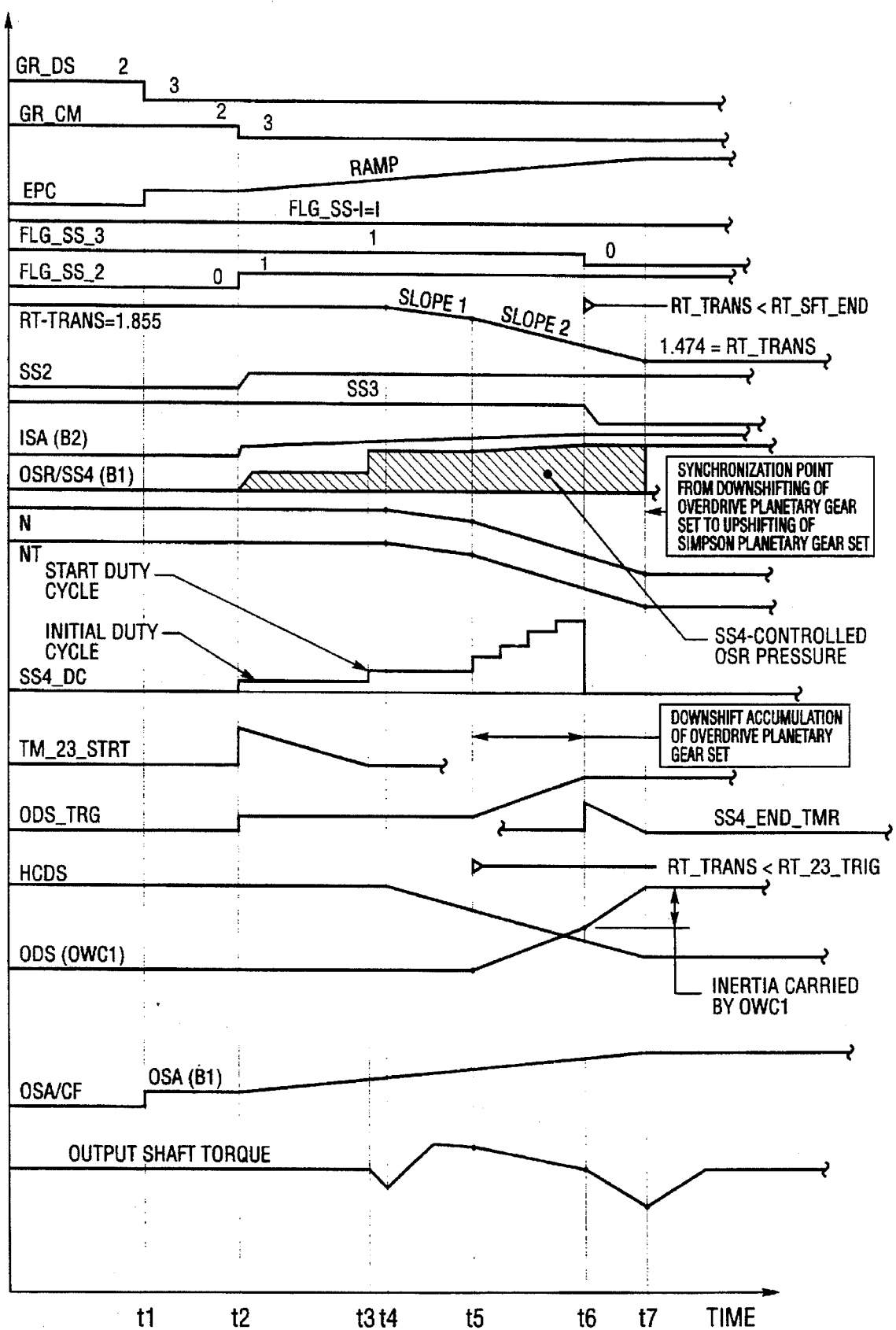
FIG. 13 is a timing chart showing the variables that are involved during a 2-3 upshift.

The execution of a 2-3 upshift involves a sequence of events and control actions with interaction between the control strategy and the control hardware. The timing diagram shown in FIG. 13 shows the execution of a 2-3 upshift. Control strategy as well as the hardware behavior are illustrated in this timing diagram.

t1:

Control Strategy (Refer to FIG. 7):

A 2-3 upshift is triggered by the control strategy based on functions of vehicle speed versus throttle position. Desired gear (GR_DS) is changed from second gear to third gear and the shift verification timer (TM_VER_SFT) is loaded. The dynamic EPC value is added for third gear.

Control Hardware:

The EPC values are raised according to the commanded EPC values.

t2:

Control Strategy (Refer to FIG. 7):

The shift verification timer TM_VER_SFT is expired and the gear commanded register GR_CM is changed from second to third gear. An initial duty cycle of shift solenoid 58 is loaded into the SS4_DC register. This initial duty cycle is required to prefill the release side of the overdrive servo 88 prior to the shift execution. In addition, the 2-3 upshift start timer TM_23_STRT is loaded. This timer is required to initiate a start duty cycle independent of the expiration of the shift verification timer TM_VER_SFT. When this timer is expired, a start duty cycle is set prior to closed loop capacity control of the overdrive band 42. An initial slip value, depending on the duty cycle value, could be introduced to the overdrive band in an open loop control manner. The TM_23_STRT timer is a function of transmission oil temperature since the applied pressure varies with duty cycle and temperature. At this point, the following important calibration parameters are calculated:

$$ODS\_TRG=NOBART*GRRAT3*FNODS\_CMPT(NOBART)$$

$$RT\_SFT\_END=GRRAT2+[FNPCSFT23(TP\_REL)*(GRRAT3-GRRAT2)]$$

$$RT\_23\_TRG=GRRAT2+[FN23CMPF(NOBART)*(GRRAT3-GRRAT2)].$$

The overdrive drum speed target value ODS_TRG is calculated based on a function FNODS_CMPT, which contains a multiplier of overdrive drum speed as a function of output shaft speed NOBART. This is calculated based on the actual output shaft speed times the gear ratio after completion of the shift (GRRAT3).

The gear ratio threshold value RT_23_TRG then is calculated based on a function FN23CMPF, percentage shift complete PCSFTCMPT, versus output shaft speed NOBART in order to initiate the start of closed loop capacity control of the overdrive band using the shift solenoid duty cycle SS4_DC.

A further gear ratio threshold value RT_SFT_END is calculated to decide the end of closed loop capacity control and to release the overdrive band capacity completely. These values are compared later with the continuously calculated variable RT_TRANS and are used for the above described functions. Shift solenoid flag 2 (FLG_SS_2) is set to 1 and the EPC-RMP timer is loaded. The EPC ramp is now executed.

Figure 7:
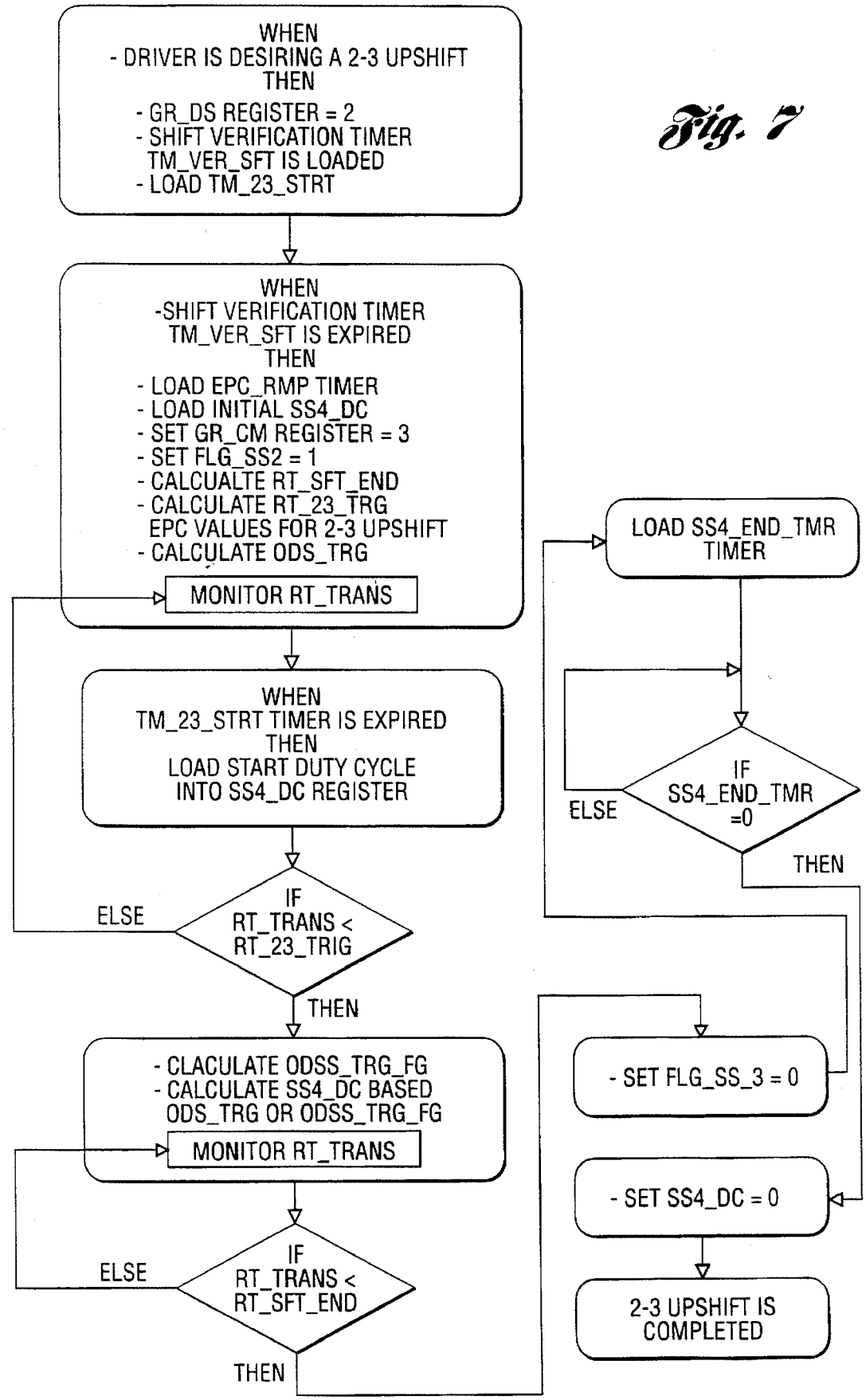
FIG. 7 is a flow diagram illustrating the electronic control strategy for a 2-3 upshift.

Control Hardware:

Shift solenoid 80 is energized and the 1-2 upshift valve 78 in bore 203 moves into upshift position. CF-pressure produced from the clutch pressure modulator forward in bore 207 is applied to the apply side of the intermediate servo 90. The characteristic of this forward modulator 92 allows capacity control from zero to maximum capacity. The intermediate band is engaged and takes the torque of the sun gear of the Simpson planetary gearset 22. At the same time, the reaction torque on overrunning brake 34 (OWC2) is reduced. The output shaft torque follows first the reaction torque characteristic of OWC2. The torque phase of the 2-3 swap-shift is initiated (see also FIG. 3). The overdrive servo release pressure, which is actual SS4 output pressure, builds up to a level where no capacity loss on the overdrive band takes place.

t3:

Control Strategy:

The duty cycle start timer (TM_23_STRT) is expired. The start duty cycle (SS4_DC_BRK) is loaded into the SS4_DC register, as seen in FIG. 7 and FIG. 13. SS4_DC_BRK is the break-away duty cycle for overdrive brake capacity.

Control Hardware:

The pressure is increased on the release side of the overdrive servo 88 since the shift solenoid duty cycle has been increased. The overdrive band capacity can be manipulated by SS4 duty cycle settings and an overdrive drum slip can be introduced prior to closed loop control of the overdrive band capacity.

t4:

Control Strategy:

The RT_TRANS value is continuously calculated based on turbine speed and output shaft speed. The RT_TRANS value starts to decrease when the inertia phase of the 2-3 upshift is started and the torque phase is completed. The shift starts with a "shift slope 1" (FIG. 13) which is entirely dependent on the CF pressure settings and the commanded EPC ramp.

Control Hardware:

The torque phase of the upshifting event of the Simpson planetary gearset 22 is completed, and the output shaft torque is completely dependent on the applied capacity of the intermediate band. The reaction torque on one-way clutch 34 (OWC2) is zero, and the high clutch drum speed (HCDS) starts to decelerate. The output shaft torque is reversed since the reaction torque is zero and ISA pressure increases capacity. The overdrive drum speed remains at zero speed.

t5:

Control Strategy:

At this point, the RT_TRANS value is smaller than the RT_23_TRIG calibration value. The closed loop control of the overdrive band capacity is now executed. Here, there are two options for control of the overdrive band capacity:

Option 1: With this option, the ODS_TRG value is directly converted into an SS4 duty cycle with the following calculation:

$$SS4\_DC=SS\$\_DC\_BRK+[(ODS\_TRG-ODS)/ODS\_TRG]*OL\_CORR$$

where

OL_CORR is a calibration constant to determine the gain of duty cycles change.

Option 2: With option 2, the ODS_TRG value is converted into a target value which is synchronized with the continuation of the shifting event. The overdrive drum speed target value is directly connected to the RT_TRANS calculation. The overdrive drum target speed value is then decreased from the initial value calculated previously by following calculation:

$$ODSS\_TRG\_FG = ODS\_TRG * (GRRAT2 - RT\_TRANS - RT\_CORR)/(GRRAT2 - GRRAT3)$$

where

ODSS_TRG_FG is the overdrive drum speed target value depending on the actual gear ratio.

Then, the SS4_DC value is calculated based on the ODSS_TRG_FG value as follows:

$$SS4\_DC = SS4\_DC\_BRK + (ODS - ODSS\_TRG\_FG) * OL\_CORR$$

The duty cycle calculation in each option takes the error between the actual overdrive drum speed ODS and the target overdrive drum speed into account and converts the calculated error in the duty cycle for shift solenoid 58. This adjusts the overdrive band capacity accordingly. Based on the capacity control on the overdrive band 42, a "shift slope 2" is initiated, which begins the downshifting event of the overdrive planetary gearset.

The timer SS4_END_TMR is loaded and kept high. This timer is needed to compensate for the SS3 pressure exhaust delay time.

Control Hardware:

The overdrive servo release pressure is either increased or decreased based on the duty cycle of solenoid 58. A second shift slope, as mentioned earlier, is introduced due to overdrive band capacity control and the additional overdrive band slip. The overdrive drum speed starts to follow the target value ODS_TRG. Independent control of the overdrive planetary gearset is initiated. The output shaft torque decreases since the capacity on the overdrive band is decreased as well.

t6:

Control Strategy:

At this point, the RT_TRANS value is smaller than the second ratio threshold RT_SFT_END. At this point in time the closed loop control of the overdrive band is terminated by setting the shift solenoid flag 3 FLG_SS_3 to zero. The duty cycle calculation for SS4 shift solenoid 58 is still kept high. This is the initiation of the synchronization between the downshifting of the overdrive planetary gearset and the upshifting of the Simpson gearset 22.

Control Hardware:

Shift solenoid 72 (SS3) is deenergized and the 3-4 upshift valve 84 moves into downshift position. The shift solenoid 58 output pressure is disconnected from the overdrive servo release side and line pressure is connected. This reduces the overdrive band capacity completely, and OWC1 takes the remaining inertia and starts to transmit full torque. The output pressure of the shift solenoid 58 stays high in order to keep the overdrive servo release area pressurized. From time point t5 to time point t6, downshift accumulation takes place for the overdrive planetary gearset in order to accomplish a smooth one-way clutch engagement of OWC1. This accumulation phase is also used to synchronize the downshifting of the overdrive planetary gearset and the upshifting of the Simpson set 22 using feedback control with overdrive drum speed. The hatched area of the overdrive servo release area (FIG. 13) indicates the time where independent capacity control takes place following time t3 using open loop control and closed loop control executed by SS4 for the overdrive gearset and the Simpson set.

Beyond timing point t2, the overdrive servo release pressure is line pressure. The output shaft torque characteristic shows another negative slope since the overdrive band has zero capacity.

t7:

Control Strategy:

The EPC_RMP timer has expired and the EPC ramp is terminated. The timer SS4_END_TMR can expire before or beyond t7 since this time is used for SS3 pressure exhaust synchronization. When timer SS4_END_TMR is expired, the SS4_DC register is set to zero since full line pressure is then connected to the overdrive servo release chamber.

Control Hardware:

The overdrive drum has reached engine speed and OWC1 is fully engaged. The high clutch drum speed (HCDS) is at zero speed. The output shaft torque characteristic is now reversed again since OWC1 then carries full torque. The torque phase of the downshifting event is initiated and the 2-3 upshift is complete. Time pressure is connected to the overdrive servo release chamber. This is the synchronization point for the downshifting overdrive gearset and the upshifting Simpson set within the calibration window shown in FIG. 3.

3-2/4-2 Downshift System

The functioning of the 3-2/4-2 downshift control system is the inverse of the 2-3 upshift event; i.e., the overdrive planetary gearset upshifts and the Simpson set 22 downshifts in a synchronized manner. During a 3-2 downshift, the Simpson set is downshifted by releasing the intermediate servo 90 for band (B2), and the OWC2 engages after the inertia phase. During a 4-2 downshift, the Simpson set 22 is downshifted by releasing the high clutch (CL2). During a 3-2 downshift, the gear ratio is changed from 1.474 to 1.86, and during a 4-2 downshift, the gear ratio is changed from 1 to 1.86.

Hydraulic Control System

The solenoid stages during a 3-2 downshift is the inverse of the 2-3 upshift, except shift solenoid 58 (SS4) is not duty cycle controlled.

| | Solenoid Stages | SS1 | SS2 | SS3 |
|---|---|---|---|---|
| 3-2 DOWNSHIFT SHIFT SEQUENCE | 3rd Gear | ON | ON | OFF |
| | Intermediate Step 3 | ON | ON | ON |
| | 2nd Gear | ON | OFF | ON |

The 4-2 downshift can be executed either in sequence, which means 4-3-2, or directly as a 4-2 downshift. The shift sequence is shown as follows:

| | Solenoid Stages | SS1 | SS2 | SS3 |
|---|---|---|---|---|
| 4-2 DOWNSHIFT SHIFT SEQUENCE | 4th Gear | OFF | OFF | OFF |
| | Intermediate Step "5th Gear" | OFF | OFF | ON |
| | 2nd Gear | ON | OFF | ON |
| 4-3-2 DOWNSHIFT SHIFT SEQUENCE | 4th Gear | OFF | OFF | OFF |
| | 3rd Gear | ON | ON | OFF |
| | Intermediate Step 3 | ON | ON | ON |
| | 2nd Gear | ON | OFF | ON |

The sequenced 4-3-2 downshift is basically the execution of a 4-3 downshift, which is the same as the 3-2 downshift of the four-speed transmission, followed by the 3-2 (SWAP-SHIFT) downshift. During the direct 4-2 downshift, the control hardware uses the 5th gear solenoid stage as an intermediate step to initiate the 4-2 downshift, as shown in the above tables.

3-2 Downshift:

FIGS. 9, 10, 11a, 11b, 12a and 12b show the 3-2 downshift hydraulic control system. The solenoid stage in third gear is SS2=ON, SS1=ON, and SS3=OFF. The intermediate servo (i.e., band B2) is engaged when the 1-2 upshift valve in bore 203 is upshifted upon being energized by shift solenoid 80. The high clutch (CL2) is exhausted over the 2-3 upshift valve 94 in bore 204. When the 3-2 downshift is initiated, the shift solenoid 3 is energized and the 3-4 upshift valve moves into upshift position. The transmission is now in intermediate step 3 shown in FIG. 11. The overdrive servo release circuit, which was previously applied with line pressure, is now exhausted over orifice 76 through the exhaust port of shift solenoid 58. The overdrive servo apply side is continuously applied with CF modulator pressure produced by the clutch pressure modulator valve 92 in bore 207. The overdrive servo is applied and initiates a 3-2 downshift by upshifting the overdrive planetary gearset.

When a certain gear ratio has been monitored by the control strategy, the transmission is commanded to execute the second gear solenoid stage as shown in FIGS. 9 and 10. The duty cycle controlled shift solenoid 58 is deenergized. Shift solenoid 80 (SS2) is turned off. With the shift solenoid 80 deenergized, the 1-2 upshift valve 78 in bore 203 moves into downshift position and the intermediate servo apply pressure is exhausted over the CF/3/4/EX circuit through the ISA/EX port located on the downshifted 2-3 upshift valve 94. Shift solenoid SS1 always stays on during the 3-2 downshift event and keeps the high clutch 44 always exhausted, together with upshifted 2-3 upshift valve 94 in bore 204. The 3-2 downshift is now complete.

4-2 Downshift:

The solenoid stage in fourth gear is SS1=OFF; SS2=OFF, and SS3=OFF. With shift solenoid SS1 turned off, the 2-3 upshift valve 94 is in the downshift position and D/2/1 pressure is present in the high clutch circuit. This can be seen in FIG. 12b where the shift valve 94 in bore 204 is shown in upshift position.

In order to initiate a direct 4-2 downshift, the overdrive planetary gearset has to be upshifted. This can only be accomplished by energizing shift solenoid 72 (SS3) first. With shift solenoid 72 turned on, the transmission is in the 5th gear solenoid stage, which corresponds to the 4th gear solenoid stage in the four-speed transmission. When shift solenoid 72 is energized, the overdrive servo release pressure is exhausted over orifice 76 through the exhaust port of shift solenoid 58 (SS4). The overdrive servo apply is pressurized with CF pressure and the overdrive band engages. This initiates the 4-2 downshift.

When the control system has monitored a certain instantaneous gear ratio level, the downshifting event of the Simpson planetary gearset is initiated. This is done by energizing shift solenoid SS1. Shift solenoid 80 (SS2) stays deenergized. With shift solenoid SS1 energized, the 2-3 upshift valve 94 moves into upshift position. The 1-2 upshift valve 78 in bore 203 is in downshift position. The upshifted 2-3 shift valve 94 in bore 204 opens the ISA/EX port as well as the CR/R/EX port. The intermediate servo apply pressure is exhausted over the ISA/EX port and the high clutch (CL2) is exhausted through the CR/R/EX port. The 4-2 downshift is now complete.

Control Strategy For 3-2/4-2 Downshift

In order to describe the complete control system, including the control strategy, the following parameters during a 3-2 downshift event are referred to:

Control Strategy:
 GR_DS desired gear
 GR_CM commanded gear
 EPC control pressure register
 FLG_SS_1 shift solenoid flag 1
 FLG_SS_2 shift solenoid flag 2
 FLG_SS_3 shift solenoid flag 3
 ODS overdrive drum speed
 N engine speed
 NT turbine speed Hydraulic and Transmission Parameters:
 SS1 shift solenoid pressure 1
 SS2 shift solenoid pressure 2
 SS3 shift solenoid pressure 3
 OSA overdrive servo apply pressure
 OSR overdrive servo release pressure
 ISA intermediate servo apply pressure
 HCDS high clutch drum speed (not calculated by control strategy)
 Output shaft torque.

Figure 14:
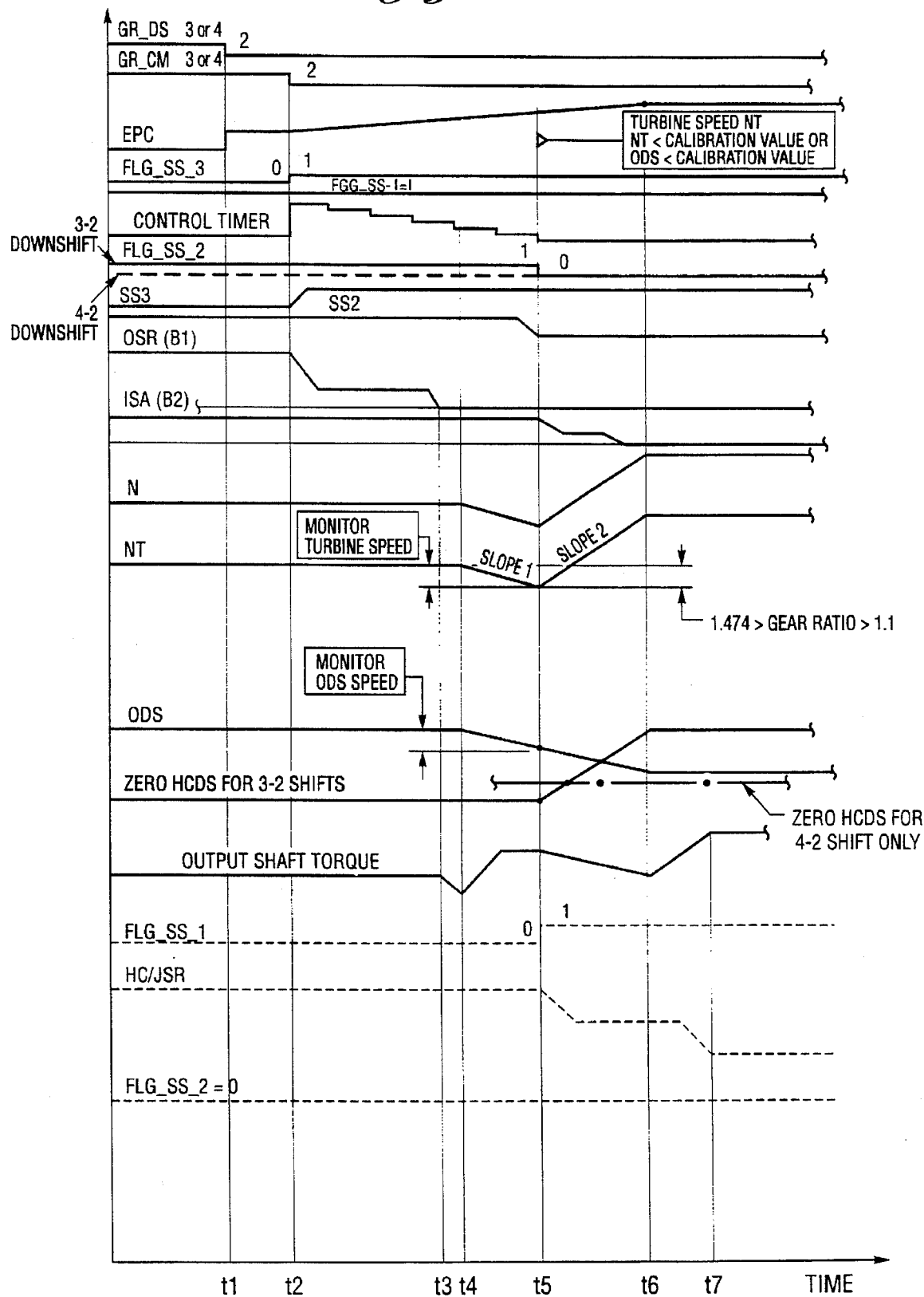
FIG. 14 is a timing chart, corresponding to the timing chart of FIG. 13, illustrating the variables involved during a 3-2/4-2 swap-shift.

FIG. 14 shows the timing diagram for a 3-2/4-2 downshift. This illustrates the interactive functions of hardware and control strategy during the 3-2/4-2 downshift event. The broken lines in FIG. 14 show the additional and actions in a 4-2 downshift.

t1:

Control Strategy:

A 3-2/4-2 downshift is triggered by the control strategy based on the function of vehicle speed versus throttle position. GR_DS is changed from third gear or fourth gear to second gear, and the shift verification timer TM_VER_SFT is loaded. The dynamic EPC value is added for second gear.

Control Hardware:

The EPC values are raised according to the commanded EPC values.

t2:

Control Strategy:

The shift verification timer TM_VER_SFT is expired, and the gear commanded register GR_CM is changed from fourth or third to second gear. A 3-2/4-2 control timer is loaded. At the same time, overdrive drum speed and turbine speed are monitored to sense the start of the downshifting event. The control timer is required in order to control the 3-2/4-2 downshift independently of the speed signals. This is needed in the event that the speed signals are not available. Shift solenoid flag 3 FLG_SS_3 is set to 1 and the EPC-RMP timer is loaded. The EPC ramp then is executed.

Control Hardware:

Shift solenoid 72 (SS3) is energized and the 3-4 shift control valve 84 in bore 215 moves into upshift position. CF-pressure produced from the clutch pressure modulator valve (forward) 92 in bore 207 is applied to the overdrive servo apply side, and the overdrive servo starts to stroke.

t3:

Control Strategy:

The control strategy monitors overdrive drum speed (ODS) and turbine speed (NT).

Control Hardware:

The overdrive servo is engaged with CF pressure. The characteristic of this modulator valve 92 allows capacity control from 0 to maximum capacity. The overdrive band engages and takes the torque of the sun gear from the overdrive planetary gearset. At the same time, the reaction torque on OWC1 relative to the input torque is reduced. The output shaft torque is determined first by the reaction torque characteristic of OWC1. The torque phase of the 3-2/4-2 swap-shift is initiated with the upshifting of the overdrive planetary gearset.

t4:

Control Strategy:

The turbine speed value (NT) and the overdrive drum speed value (ODS) start to decrease since the inertia phase of the 3-2/4-2 shift is started and the torque phase is completed. Both speed signals are still being monitored. The shift starts with a "shift slope 1" (see FIG. 14), which is entirely dependent on the CF pressure settings on the overdrive band according to the commanded EPC ramp.

Control Hardware:

The torque phase of the upshifting overdrive planetary gearset is completed and the output shaft torque is completely dependent on the applied capacity on the overdrive band 42. The reaction torque on one-way clutch 16 (OWC1) is zero and the overdrive drum speed (ODS) starts to decrease. The output shaft torque is reversed since the reaction torque is zero and OSA pressure is increasing. During a 3-2 downshift, the high drum still stays at zero speed. When a 4-2 downshift is commanded, the intermediate band is released and the high clutch is applied for 4th gear. The high clutch drum turns clockwise in this case, the same direction as engine speed.

t5:

Control Strategy:

At this point, the ODS value or the NT value is smaller than a calibration value. The downshifting event of Simpson set 22 now is initiated. The shift solenoid flag 2 (FLG__SS__2) is set to zero during a 3-2 downshift. At this time, the 3-2/4-2 control timer is expired, allowing 3-2/4-2 downshift execution. Because the Simpson planetary gearset is downshifted, a "shift slope 2" is initiated (see FIG. 14). The control strategy has sensed that enough capacity is transmitted by the engaged overdrive band. This represents the feedback of the control system for executing a 3-2/4-2 downshift. During a 4-2 downshift, the shift solenoid flag 2, FLG__SS__2 is zero and stays zero. Here, the shift solenoid flag 1, FLG__SS__1 is set to 1, initiating the downshift of Simpson planetary gearset 22.

Control Hardware:

For a 3-2 downshift, the intermediate servo apply pressure is exhausted by the deenergized shift solenoid 80 (SS2), which makes the 1-2 upshift valve 78 in bore 203 move to downshift position. In this case, the shift solenoid SS1 is energized and the 2-3 upshift valve 94 in bore 204 is in downshift position. This opens the ISA/EX exhaust port to the intermediate servo. A second shift slope, as mentioned earlier, is introduced due to the reduced capacity of the intermediate band 46. The high clutch drum speed starts to accelerate from zero rpm. The output shaft torque decreases since the capacity of the intermediate band 46 is decreased as well. For a 4-2 downshift, the shift solenoid 80 (SS2) stays deenergized. High clutch 44 is pressurized with D/2/1 pressure and the apply side of the intermediate servo is energized with CF pressure. The high clutch drum rotates in the direction of the engine speed with the value of engine speed. When shift solenoid SS1 is energized, the intermediate servo apply pressure and the high clutch pressure are exhausted, and the high clutch drum is first decelerated down to zero speed by the input torque. Then the high clutch is accelerated in the direction opposite to the rotational direction of the engine speed up to the point when overrunning clutch 34 (OWC2) is engaged. The inertia phase of the downshifting of the Simpson planetary gearset 22 thus is initiated.

t6:

Control Strategy:

The EPC__RMP timer expires and the EPC ramp is terminated.

Control Hardware:

The high clutch drum has reached its rotational speed and the overrunning clutch 34 (OWC2) is fully engaged. The overdrive drum speed (ODS) is zero. The output shaft torque characteristic is now reversed again since OWC2 now carries full torque. The torque phase of the downshifting Simpson gearset is initiated and the inertia phase is completed. The 3-2/4-2 downshift then is completed.

Figure 8:
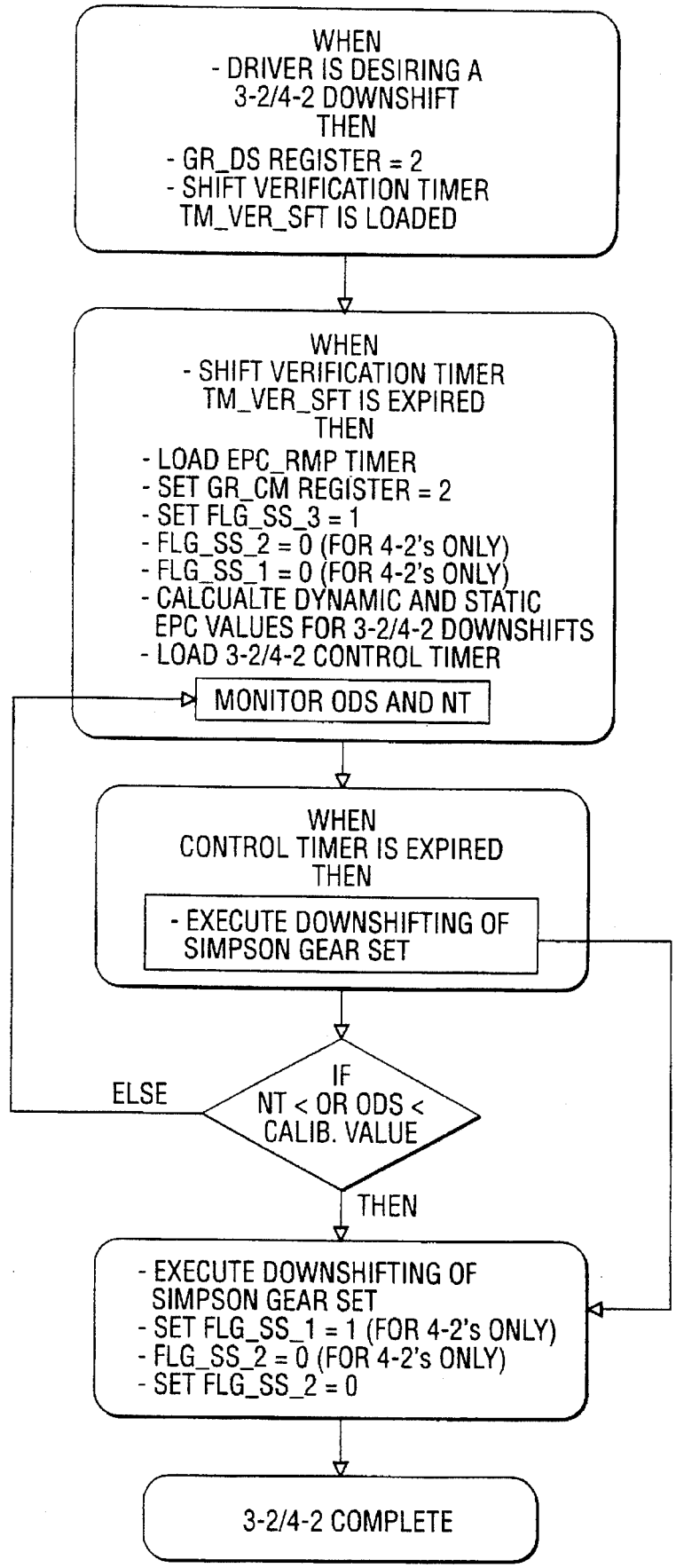
FIG. 8 is a flow chart illustrating the control strategy for a 3-2 downshift and a 4-2 downshift.

The flow chart of FIG. 8 shows the control strategy during a 3-2/4-2 downshift.

Summary

The five-speed transmission control system controls two independent gearing units of the transmission, the overdrive planetary gearset and the Simpson planetary gearset. These two independent gearing units are compounded together in series. The electronic control system controls the upshifting event of the overdrive planetary gearset and the downshifting event of the Simpson planetary gearset during a 2-3 upshift, and vice-versa during a 3-2 downshift. Both events are synchronized and capacity control is executed during the synchronization process.

A conventional hydraulic control system is not capable of executing such a "swap-shift." With the improved control system of this invention, this shift execution is accomplished by applying electronic control and feedback control techniques. A further advantage of this control system is the independent capacity control.

My invention will make it possible to provide improved fuel economy and performance without adding additional gearing compared to conventional transmissions and without increasing complexity of the control system.

Having described a preferred embodiment of the invention, what we claim and desire to secure by U.S. Letters Patent is:

1. An automatic transmission for a vehicle having gearing defining multiple torque flow paths between a throttle controlled engine and a torque output shaft comprising a first gear unit with at least three forward-driving ratios and a second gear unit with at least two forward driving ratios, said gear units being disposed in series relationship in said torque flow paths, said torque flow paths including a torque converter with an impeller driven by said engine and a turbine connected drivably to said second gear unit;

pressure operated clutch and brake means for establishing and disestablishing ratio changes in said gearing including a first reaction brake means for anchoring a reaction element of said first gear unit during operation in an intermediate ratio of said first gear unit and a second reaction brake means for anchoring a reaction element of said second gear unit during operation in the higher of said two forward driving ratios of said second gear unit;

said first reaction brake means including a first brake servo having a first servo piston and brake release and apply pressure chambers on opposite sides of said first servo piston;

said second reaction brake means including a second brake servo having a second servo piston and brake release and apply pressure chambers on opposite sides of said second brake servo piston;

a control valve system for controlling distribution of pressure to said clutch and brake means including said apply pressure chambers for said first and second brake servos and said release pressure chamber for said second brake servo, said valve system including a source of line pressure and a main pressure regulator valve means for regulating said line pressure; electronic pressure control means communicating with said main pressure regulator valve means for establishing a control pressure determined by operating variables including vehicle speed, turbine speed and engine throttle position, an electronic control pressure passage communicating with said electronic pressure control means;

first pressure modulator valve means in said control valve system for establishing a first modulated control pressure including a pressure area in communication with said electronic control pressure passage;

second pressure modulator valve means in said control system for establishing a second modulated control pressure;

said valve system including ratio shift control valve means for providing controlled communication between said apply pressure chambers of said first and second brake servos and said first pressure modulator valve means and between said release pressure chamber of said second brake servo and said second pressure modulator valve means whereby brake capacities during application and release of said first and second reaction brake means are controlled independently, one with respect to the other, to effect smooth transition of reaction torque from one of said gear units to the other during upshifts and downshifts.

2. The transmission set forth in claim 1 wherein said electronic pressure control means includes an electronic processor, a first speed sensor means for detecting the speed of said reaction element of said second gear unit, a second speed sensor means for detecting a speed that is functionally related to output shaft speed, and a third speed sensor for detecting turbine speed;

said electronic processor responding to values detected by said sensors for said second gear unit reaction element speed, said speed that is functionally related to output shaft speed and said turbine speed to develop a value for said control pressure that effects said independent brake capacity control of said first and second reaction brake means during said upshifts and downshifts.

3. The transmission set forth in claim 2 wherein said control valve system includes shift valve means responsive to control signals from said processor determined by said variables to control distribution and release of pressure to said clutch and brake means during ratio changes;

one of said shift valve means and said additional modulator valve means having common portions and responding to shift command signals from said controller to establish said additional modulated control pressure.

4. The transmission as set forth in claim 2 wherein engagement of each of said first and second reaction brake means includes a torque phase and an inertia phase, said independent control of the brake capacities of said reaction brake means establishing the beginning of said inertia phase for said first gear unit after completion of a portion of said inertia phase of said second gear unit during downshifts.

5. The transmission as set forth in claim 2 wherein engagement of each of said first and second reaction brake means includes a torque phase and an inertia phase, said independent control of capacities of said reaction brake means establishing the beginning of said inertia phase of said second gear unit after completion of a portion of said inertia phase of said first gear unit and establishing the end of said inertia phase of said second gear unit before the end of said inertia phase of said first gear unit during upshifts.

6. The transmission as set forth in claim 5 wherein said independent control of capacities of said reaction brake means establishes the end of said torque phase of said second gear unit and the end of said inertia phase of said first gear unit during a calibrated time interval as said upshift is completed.

7. The transmission as set forth in claim 5 wherein said valve system includes a shift control valve means for establishing communication between said line pressure source and said brake release pressure chamber for said second brake servo upon completion of said torque phase for said second gear unit during upshifts thereby fully releasing said second brake servo.

8. The transmission as set forth in claim 1 wherein said first gear unit has a low ratio reaction element in addition to said reaction element for said reaction brake means and clutch means for establishing unitary drive ratio in said first gear unit;

said second gear unit being a simple planetary overdrive gear unit, said reaction element of said second gear unit being a sun gear, and a simple planetary gear unit clutch means for establishing unitary drive ratio in said second gear unit.

9. The transmission as set forth in claim 8 wherein said simple planetary gear unit clutch means is an overrunning coupling between two torque delivery elements of said simple planetary gear unit.

10. The transmission as set forth in claim 8 wherein said electronic pressure control means includes an electronic processor, a first speed sensor means for detecting a speed that is functionally related to the speed of said reaction element of said second gear unit and a second speed sensor means for detecting output shaft speed, and a third speed sensor for detecting turbine speed;

said electronic processor responding to values detected by said second gear unit reaction element speed, said speed that is functionally related to output speed and said turbine speed to develop a value for said control pressure that effects said independent brake capacity control of said first and second reaction brake means during said upshifts and downshifts.

11. The transmission as set forth in claim 10 wherein engagement of each of said first and second reaction brake means include a torque phase and an inertia phase, said independent brake capacity control of said reaction brake means establishing the beginning of said inertia phase for said first gear unit after completion of a portion of said inertia phase of said second gear unit during said downshifts.

12. The transmission as set forth in claim 10 wherein engagement of each of said first and second reaction brake means includes a torque phase and an inertia phase, said independent brake capacity control of said reaction brake means establishing the beginning of said inertia phase of said second gear unit after the completion of a portion of said inertia phase of said second gear unit and establishing the end of said inertia phase of said second gear unit before the end of said inertia phase of said first gear unit during said upshifts.

13. The transmission as set forth in claim 12 wherein said independent capacity control of said reaction brake means establishes the end of said torque phase of said second gear unit and the end of said inertia phase of said first gear unit during a calibrated time interval upon completion of said upshifts.

14. The transmission as set forth in claim 12 wherein said ratio shift control valve means includes movable shift valve elements and solenoid actuators for said shift valve elements, said ratio shift control valve means establishing communication between said line pressure source and said brake release pressure chamber for said second brake servo upon completion of said torque phase for said second gear unit during said upshift thereby fully releasing said second brake servo.

15. An automatic transmission for a vehicle having gearing defining at least first, second, third and fourth forward-driving overall ratios in torque flow paths between a throttle controlled engine and a torque output shaft comprising a first gear unit with at least three forward driving ratios and a second gear unit with at least two forward driving ratios, said gear units being disposed in series relationship in said torque flow paths, said torque flow paths including a torque converter with an impeller driven by said engine and a turbine connected drivably to said second gear unit;

pressure operated clutch and brake means for establishing and disestablishing ratio changes in said gearing including a friction clutch connecting selective two torque delivery elements of said first gear unit to establish a ratio of unity for said first gear unit, first reaction brake means for anchoring a reaction element of said first gear unit during operation in an intermediate ratio of said first gear unit and a second reaction brake means for anchoring a reaction element of said second gear unit during operation in the higher of said two forward driving ratios of said second gear unit;

said first reaction brake means including a first brake servo having a first servo piston and brake release and apply pressure chambers on opposite sides of said first servo piston;

said second reaction brake means including a second brake servo having a second servo piston and brake release and apply pressure chambers on opposite sides of said second brake servo piston;

a control valve system for controlling distribution of pressure to said clutch and brake means including said friction clutch, said apply pressure chambers for said first and second brake servos and said release pressure chamber for said second brake servo, said valve system including a source of line pressure and a main pressure regulator valve means for regulating said line pressure;

electronic pressure control means communicating with said main pressure regulator valve means for establishing a control pressure determined by operating variables including vehicle speed, turbine speed and engine throttle position, an electronic control pressure passage communicating with said electronic pressure control means;

first pressure modulator valve means in said control valve system for establishing a first modulated control pressure including a pressure area in communication with said electronic control pressure passage;

second pressure modulator valve means in said control valve system for establishing a second modulated control pressure;

said valve system including ratio shift control valve means for providing controlled communication between said apply pressure chambers of said first and second brake servos and said first pressure modulator valve means and between said release pressure chamber of said second brake servo and said second pressure modulator valve means, said ratio shift control valve means providing also selective distribution of said line pressure to said friction clutch during operation of said first gear unit in the highest of said three forward driving ratios therefor, whereby application and release of said first and second reaction brake means and application of said friction clutch are controlled independently, one with respect to the other, to effect smooth ratio downshifts from said fourth forward driving overall ratio to said second forward driving overall ratio.

16. The transmission set forth in claim 15 wherein said electronic pressure control means includes an electronic processor, a first speed sensor means for detecting the speed of said reaction element of said second gear unit, a second speed sensor means for detecting a speed that is functionally related to output shaft speed, and a third speed sensor for detecting turbine speed;

said electronic processor responding to values detected by said sensors for said second gear unit reaction element speed, said speed that is functionally related to output shaft speed and said turbine speed to develop a value for said control pressure that effects said control of said first and second reaction brake means and said friction clutch during said downshifts from said fourth forward driving overall ratio to said second forward driving overall ratio.

\* \* \* \* \*